(12) United States Patent
Tokozakura et al.

(10) Patent No.: US 10,641,555 B2
(45) Date of Patent: May 5, 2020

(54) HEAT EXCHANGER FOR VEHICLE

(71) Applicants: TOYOTA JIDOSHA KABUSHIKI KAISHA, Toyota-shi (JP); MAHLE Filter Systems Japan Corporation, Toshima-ku (JP)

(72) Inventors: Daisuke Tokozakura, Susono (JP); Takahiro Shiina, Numazu (JP); Satoshi Tominaga, Susono (JP); Naoki Ooi, Stuttgart (DE); Katsuhiro Isoda, Sayama (JP)

(73) Assignees: TOYOTA JIDOSHA KABUSHIKI KAISHA, Toyota-shi (JP); MAHLE Filter Systems Japan Corporation, Toshima-ku (JP)

( * ) Notice: Subject to any disclaimer, the term of this patent is extended or adjusted under 35 U.S.C. 154(b) by 34 days.

(21) Appl. No.: 15/687,026

(22) Filed: Aug. 25, 2017

(65) Prior Publication Data
US 2018/0058766 A1   Mar. 1, 2018

(30) Foreign Application Priority Data
Aug. 29, 2016   (JP) .................................. 2016-166820

(51) Int. Cl.
 *F28D 9/00* (2006.01)
 *F16N 39/02* (2006.01)
 (Continued)

(52) U.S. Cl.
 CPC .......... *F28D 9/0093* (2013.01); *F01M 5/002* (2013.01); *F16N 39/02* (2013.01); *F28D 9/005* (2013.01);
 (Continued)

(58) Field of Classification Search
 CPC ................. F28D 9/0093; F28D 9/005; F28D 2021/0089; F28D 2021/0094; F01M 5/002; F16N 39/02
 See application file for complete search history.

(56) References Cited

U.S. PATENT DOCUMENTS

| 4,327,802 A | * | 5/1982 | Beldam | ................. F28D 1/0333 165/153 |
| 6,142,221 A | * | 11/2000 | Johansson | ............... F28D 9/005 165/140 |

(Continued)

FOREIGN PATENT DOCUMENTS

| CN | 104567486 A | 4/2015 |
| JP | 63-90765 U | 6/1988 |

(Continued)

*Primary Examiner* — Devon Russell
(74) *Attorney, Agent, or Firm* — Oblon, McClelland, Maier & Neustadt, L.L.P.

(57) ABSTRACT

A heat exchanger for a vehicle is mounted in a vehicle having a power train through which an engine coolant, an engine oil and a transmission oil flow and in which a flow rate of the engine oil and a flow rate of the transmission oil are different from each other. A first flow passage for causing the engine coolant to flow, a second flow passage for causing the engine oil to flow, and a third flow passage for causing the transmission oil to flow are formed through lamination of a plurality of plates. The heat exchanger includes a region where the first flow passage is adjacent only to that one of the second flow passage and the third flow passage through which a fluid flows at lower flow rate.

8 Claims, 11 Drawing Sheets

(51) Int. Cl.
 *F01M 5/00* (2006.01)
 *F28D 21/00* (2006.01)
(52) U.S. Cl.
 CPC ............... *F28D 2021/0089* (2013.01); *F28D 2021/0094* (2013.01)

(56) References Cited

U.S. PATENT DOCUMENTS

| | | | | |
|---|---|---|---|---|
| 9,343,755 | B2* | 5/2016 | Vanderwees | H01M 8/04141 |
| 9,581,367 | B2* | 2/2017 | Mann | F25B 39/00 |
| 10,018,102 | B2* | 7/2018 | Tokozakura | F01P 11/08 |
| 2007/0267169 | A1* | 11/2007 | Acre | B60H 1/3227 |
| | | | | 165/42 |
| 2008/0121381 | A1* | 5/2008 | So | F28D 1/0333 |
| | | | | 165/140 |
| 2013/0126149 | A1* | 5/2013 | Kim | F01P 3/18 |
| | | | | 165/297 |
| 2013/0133874 | A1* | 5/2013 | Kim | F01P 3/18 |
| | | | | 165/296 |
| 2013/0140017 | A1* | 6/2013 | Kim | F28F 27/02 |
| | | | | 165/299 |
| 2015/0101781 | A1* | 4/2015 | Kim | F01P 3/12 |
| | | | | 165/96 |
| 2017/0030253 | A1* | 2/2017 | Tokozakura | F01P 11/08 |
| 2017/0030254 | A1* | 2/2017 | Tokozakura | F01P 11/08 |

FOREIGN PATENT DOCUMENTS

| | | |
|---|---|---|
| JP | 2010-510471 A | 4/2010 |
| JP | 2013-113578 | 6/2013 |
| JP | 2013-120054 | 6/2013 |
| JP | 2017-26274 | 2/2017 |
| JP | 2017-26275 | 2/2017 |
| WO | WO 2008/061362 A | 5/2008 |

* cited by examiner

HEAT EXCHANGER FOR VEHICLE

INCORPORATION BY REFERENCE

The disclosure of Japanese Patent Application No. 2016-166820 filed on Aug. 29, 2016 including the specification, drawings and abstract is incorporated herein by reference in its entirety.

BACKGROUND

1. Technical Field

The disclosure relates to a heat exchanger for a vehicle.

2. Description of Related Art

A three-phase heat exchanger for a vehicle that is mounted in a vehicle to exchange heat among an engine coolant (coolant), an engine oil and a transmission oil is known. For example, Japanese Patent Application Publication No. 2013-113578 (JP 2013-113578 A) discloses a heat exchanger for a vehicle that exchanges heat between the engine coolant and both the engine oil and the transmission oil by arranging a flow passage for the engine coolant between a flow passage for the engine oil and a flow passage for the transmission oil.

SUMMARY

In general power trains for vehicles, the flow rate of the transmission oil is often lower than the flow rates of the engine coolant and the engine oil. In this case, with the heat exchanger for the vehicle in which the flow passages are arranged such that the engine coolant exchanges heat with both the engine oil and the transmission oil as described in Japanese Patent Application Publication No. 2013-113578 (JP 2013-113578 A), the amount of heat exchange between the transmission oil and the engine coolant is smaller than the amount of heat exchange between the engine oil and the engine coolant. Accordingly, in the case where the flow rate of the transmission oil is lower than the flow rates of the other fluids, the conventional configuration may not be able to sufficiently raise or lower the temperature of the transmission oil.

Besides, in certain power trains for vehicles, the flow rate of the engine oil may be lower than the flow rates of the engine coolant and the transmission oil. In this case, with the heat exchanger for the vehicle as described in Japanese Patent Application Publication No. 2013-113578 (JP 2013-113578 A), the amount of heat exchange between the engine oil and the engine coolant is smaller than the amount of heat exchange between the transmission oil and the engine coolant. Accordingly, in the case where the flow rate of the engine oil is lower than the flow rates of the other fluids, the conventional configuration may not be able to sufficiently raise or lower the temperature of the engine oil.

The disclosure provides a heat exchanger for a vehicle capable of increasing the amount of heat exchange between a fluid whose flow rate is relatively low and an engine coolant, in the case where heat is exchanged among a plurality of fluids.

An aspect of the disclosure is a heat exchanger for a vehicle. The vehicle includes a power train that is configured such that an engine coolant, an engine oil and a transmission oil flow through the power train and that a flow rate of the engine oil and a flow rate of the transmission oil are different from each other. The heat exchanger includes a first flow passage, a second flow passage, and a third flow passage. The first flow passage through which the engine coolant flows. The second flow passage through which the engine oil flows. The third flow passage through which the transmission oil flows. The first flow passage, the second flow passage and the third flow passage is compartmentalized through lamination of a plurality of plates. The heat exchanger is configured such that heat exchange is carried out between the respective flow passages that are adjacent to each other in a lamination direction of the plurality of the plates. The heat exchanger includes a region where the first flow passage is adjacent only to that one of the second flow passage and the third flow passage through which a fluid flows at lower flow rate.

Thus, the heat exchanger for the vehicle has a region where the first flow passage is adjacent only to that one of the second flow passage and the third flow passage through which the fluid flows at lower flow rate, in the lamination direction. Therefore, in this region, heat can be exchanged between the fluid whose flow rate is low and the engine coolant, without being influenced by the other fluid.

In the heat exchanger for the vehicle, the power train may be configured such that a flow rate of the transmission oil is lower than a flow rate of the engine oil. The heat exchanger may include a first region and a second region such that the first region includes at least one flow passage group in which the first flow passage, the third flow passage and the first flow passage are sequentially adjacent to one another, and a region where the first flow passage is adjacent only to the third flow passage, and that the second region includes at least one flow passage group in which the second flow passage, the third flow passage, the second flow passage, the first flow passage and the second flow passage are sequentially adjacent to one another. The first region and the second region may be adjacent to each other in the lamination direction.

Thus, the heat exchanger for the vehicle has the region where the first flow passage is adjacent only to the third flow passage in the lamination direction. Therefore, in this region, heat can be exchanged between the transmission oil and the engine coolant without being influenced by the engine oil. Accordingly, even in the case where the heat exchanger is mounted in a vehicle having a power train in which the flow rate of the transmission oil is lower than the flow rate of the engine oil, the temperature of the transmission oil can be sufficiently raised or lowered.

In the heat exchanger for the vehicle, the power train may be configured such that a flow rate of the engine oil is lower than a flow rate of the transmission oil. The heat exchanger may include a first region and a second region such that the first region includes at least one flow passage group in which the first flow passage, the second flow passage and the first flow passage are sequentially adjacent to one another, and a region where the first flow passage is adjacent only to the second flow passage, and that the second region includes at least one flow passage group in which the third flow passage, the second flow passage, the third flow passage, the first flow passage and the third flow passage are sequentially adjacent to one another. The first region and the second region may be adjacent to each other in the lamination direction.

Thus, the heat exchanger for the vehicle has the region where the first flow passage is adjacent only to the second flow passage in the lamination direction. Therefore, in this region, heat can be exchanged between the engine oil and the engine coolant without being influenced by the transmission oil. Accordingly, even in the case where the heat exchanger is mounted in a vehicle having a power train in which the flow rate of the engine oil is lower than the flow rate of the transmission oil, the temperature of the engine oil can be sufficiently raised or lowered.

In the heat exchanger for the vehicle, the power train may be configured such that a flow rate of the transmission oil is lower than a flow rate of the engine oil. The heat exchanger may include a first region, a second region and a third region such that the first region includes at least one flow passage group in which the first flow passage, the third flow passage and the first flow passage are sequentially adjacent to one another, and a region where the first flow passage is adjacent only to the third flow passage, that the second region includes at least one flow passage group in which the third flow passage, the second flow passage and the third flow passage are sequentially adjacent to one another, and that the third region includes at least one flow passage group in which the second flow passage, the first flow passage and the second flow passage are sequentially adjacent to one another. The first region, the second region and the third region may be adjacent to one another in the lamination direction in a sequence of the first region, the third region and the second region.

Thus, the heat exchanger the vehicle has the region where the first flow passage is adjacent only to the third flow passage in the lamination direction. Therefore, in this region, heat can be exchanged between the transmission oil and the engine coolant without being influenced by the engine oil. Accordingly, even in the case where the heat exchanger is mounted in a vehicle having a power train in which the flow rate of the transmission oil is lower than the flow rate of the engine oil, the temperature of the transmission oil can be sufficiently raised or lowered.

In the heat exchanger for the vehicle, the third flow passage that is included in the second region may be located upstream of the third flow passage that is included in the first region, in a flow direction of the transmission oil flowing through the heat exchanger.

Thus, the heat exchanger for the vehicle can efficiently raise or lower the temperature of the transmission oil whose flow rate is low, by first exchanging heat between the transmission oil and the engine oil, which are different in temperature from each other by a small value, in the second region, and then exchanging heat between the transmission oil, which has exchanged heat with the engine oil, and the engine coolant in the first region.

In the heat exchanger for the vehicle, the plates that constitute the first flow passage, the second flow passage and the third flow passage may be provided with inflow holes and outflow holes for the engine coolant, the engine oil and the transmission oil respectively, such that flow directions of fluids flowing through adjacent ones of the flow passages are opposed to each other.

Thus, the heat exchanger for the vehicle can increase the relative amount of heat that can be exchanged between adjacent fluids per unit time and the number of opportunities to enable heat exchange between adjacent fluids per unit time in comparison with the case of parallel flow, by being configured such that adjacent fluids flow oppositely to each other. In this manner, the difference in temperature between adjacent fluids can be rapidly reduced, and heat exchange can be more efficiently carried out than in the case of parallel flow.

In the heat exchanger for the vehicle, the inflow holes and the outflow holes may be provided respectively through the plates at such positions that a straight line joining the inflow and outflow holes of the second flow passage to each other and a straight line joining the inflow and outflow holes of the third flow passage to each other intersect with each other.

Thus, the heat exchanger for the vehicle can increase the relative amount of heat exchange between the engine oil and the transmission oil and the number of opportunities for heat exchange therebetween in comparison with, for example, a case where the flow directions of both the fluids do not intersect with each other, by ensuring that the flow direction of the engine oil and the flow direction of the transmission oil intersect with each other. Therefore, heat can be efficiently exchanged between the engine oil and the transmission oil.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A heat exchangers for a vehicle according to the embodiments of the disclosure will be described with reference to the drawings. Incidentally, the disclosure is not limited to the following embodiments thereof. Besides, components in the following embodiments of the disclosure include what is easy and replaceable by those skilled in the art or what is substantially identical thereto.

Each of the heat exchangers for the vehicle according to the disclosure is a three-phase heat exchanger that is mounted in a vehicle to exchange heat among three fluids, namely, an engine coolant (hereinafter referred to as "the Eng coolant"), an engine oil (hereinafter referred to as "the Eng oil") and a transmission oil (hereinafter referred to as "the T/M oil"). For example, an AT vehicle, a CVT vehicle and an HV vehicle can be mentioned as the vehicle that is mounted with each of the heat exchangers for the vehicle according to the disclosure (which holds true for "the vehicle" in the following description).

The heat exchanger for the vehicle according to the first embodiment of the disclosure is designed to be mounted in a vehicle having a power train through which the Eng coolant and the Eng oil flow and in which the flow rate of the Eng oil and the flow rate of the T/M oil are different from each other, specifically, a power train in which the flow rate of the T/M oil is lower than the flow rates of the Eng coolant and the Eng oil. The heat exchanger according to the first embodiment of the disclosure aims mainly at increasing the amount of heat exchange between the T/M oil, whose flow rate is low, and the Eng coolant.

Figure 1:
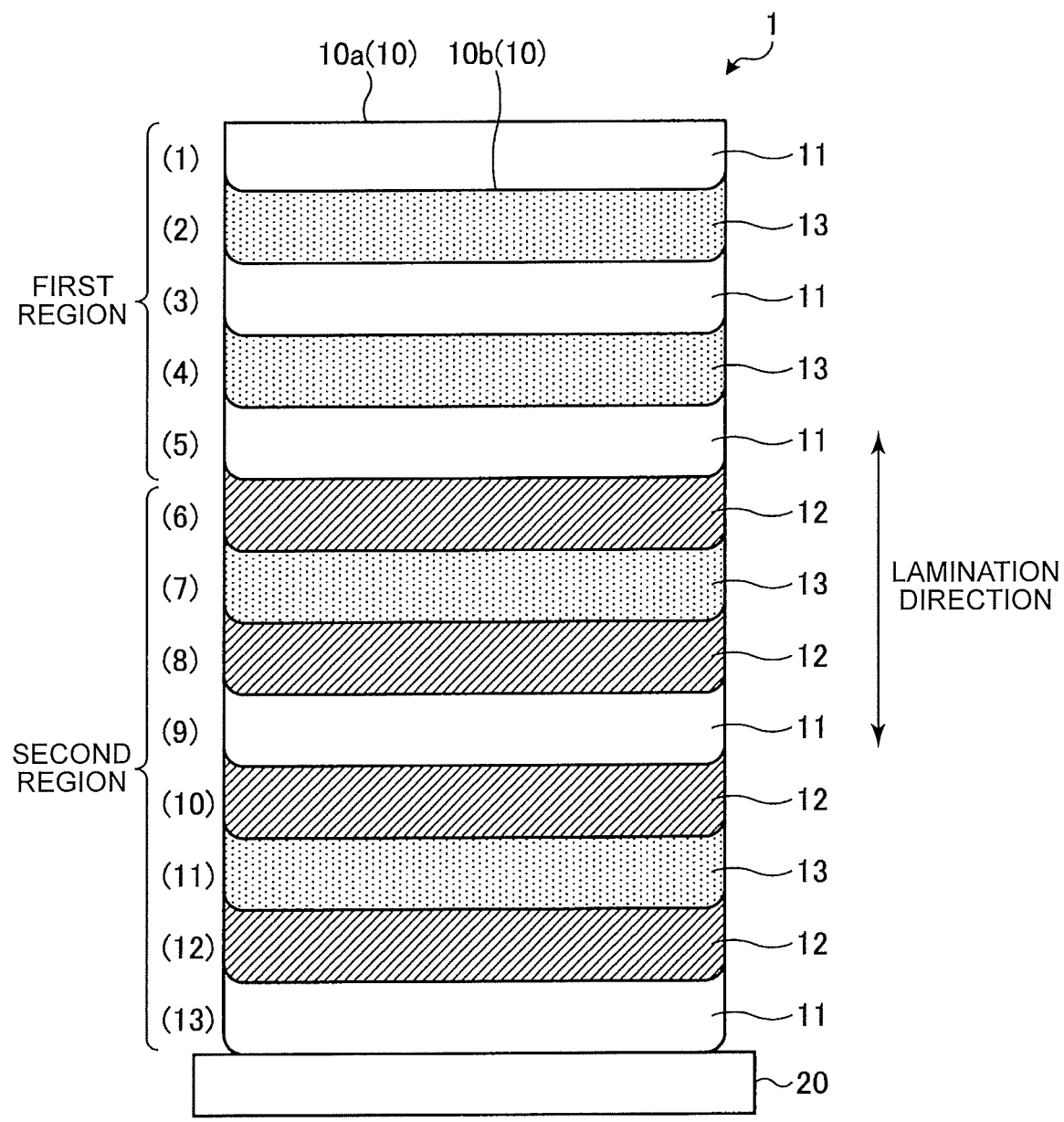
FIG. 1 is a view schematically showing the configuration of a heat exchanger for the vehicle according to the first embodiment of the disclosure.

As shown in FIG. 1, the heat exchanger 1 is constituted by laminating a plurality of plates (plate bodies) 10 made of aluminum alloy or the like on a base 20 and integrally linking them. Moreover, in the heat exchanger 1, a flat plate 10a that functions as an uppermost lid member and a plurality of dish-shaped plates 10b are combined with one another (stacked on one another), so flow passages through which the respective fluids flow are formed between two adjacent ones of the plates 10. Incidentally, the heat exchanger 1 is directly mounted on an engine unit of the vehicle via, for example, the base 20.

Although not shown in FIG. 1, fins (e.g., corrugated fins) are accommodated between the plates 10 respectively. The plates 10 and the fins are integrally linked with each other respectively through a heat treatment or the like. Incidentally, the foregoing word "dish-shaped" means a shape having a hollowed flat surface, a bottom surface and a lateral surface like, for example, the dish-shaped plates 10b shown in the drawing.

In the heat exchanger 1, as shown specifically in FIG. 1, first flow passages 11 for causing the Eng coolant to flow, second flow passages 12 for causing the Eng oil to flow and third flow passages 13 for causing the T/M oil to flow are formed through the heat exchanger 1, by laminating the plurality of the plates 10 (the flat plate 10a and the dish-shaped plates 10b) on one another. Thus, the heat exchanger 1 is configured such that the respective fluids exchange heat with one another between those of the flow passages which are vertically adjacent to each other in a lamination direction of the plates 10 (hereinafter referred to simply as "the lamination direction") via the plates 10 (specifically, bottom surfaces of the dish-shaped plates 10b).

It should be noted herein that spaces corresponding to the first flow passages 11 are not hatched, spaces corresponding to the second flow passages 12 are diagonally hatched, and spaces corresponding to the third flow passages 13 are hatched in a dotted manner, in FIG. 1. Incidentally, "the flow passages" in the present embodiment of the disclosure specifically mean predetermined spaces that are compartmentalized by combining the plurality of the plates 10 with one another.

The first flow passages 11, the second flow passages 12 and the third flow passages 13 are arranged across the plates 10 (specifically the bottom surfaces of the dish-shaped plates 10b) respectively, and are compartmentalized such that the fluids flowing through the respective flow passages do not mix with one another. Besides, the flow passages through which the same fluid flows communicate with one another via interlayer communication passages 113, 123 and 133 (see FIG. 2), which will be described later.

As shown in FIG. 1, the heat exchanger 1 is constituted of a total of thirteen layers. The first flow passages 11 are arranged in the first, third, fifth, ninth and thirteenth layers from above, the second flow passages 12 are arranged in the sixth, eighth, tenth and twelfth layers from above, and the third flow passages 13 are arranged in the second, fourth, seventh and eleventh layers from above. Incidentally, numerals (1) to (13) shown in parentheses next to the respective flow passages in the drawing indicate layer numbers in the case where the respective flow passages are counted from above. The expression "O-th layer" in the following description indicates the layer number in the case where the respective flow passages are counted from above, as is the case with the aforementioned numerals shown in FIG. 1.

The heat exchanger 1 has two regions, namely, a first region and a second region as regions where a plurality of fluids exchange heat with one another. The first region is a region that aims at increasing the amount of heat exchange between the T/M oil and the Eng coolant. The first region includes at least one three-layer flow passage group in which the first flow passage 11, the third flow passage 13 and the first flow passage 11 are sequentially adjacent to one another, and the first flow passages 11 and the third flow passages 13 are alternately arranged in the lamination direction. As shown in FIG. 1, the first region according to the present embodiment of the disclosure is constituted of a total of five layers, namely, the first flow passage 11, the third flow passage 13, the first flow passage 11, the third flow passage 13 and the first flow passage 11, which are arranged in this sequence from above.

Besides, as shown in FIG. 1, the first region includes a region where the first flow passage 11 is adjacent only to the third flow passages 13, namely, that one of the second flow passage 12 and the third flow passage 13 through which the fluid flows at lower flow rate. That is, the first region includes the first flow passages 11, which are arranged in such a manner as to be adjacent to the third flow passages 13 on one side in the lamination direction and not to be adjacent to the second flow passages 12 on the other side in the lamination direction.

For example, the first flow passage 11 in the first layer is adjacent to the third flow passage 13 in the second layer only on one side (a lower surface side) in the lamination direction, and is not adjacent to any other flow passage on the other side (an upper surface side) in the lamination direction. Besides, the first flow passage 11 in the third layer is adjacent to the third flow passages 13 in the second and fourth layers on both sides (both surface sides) in the lamination direction. As described hitherto, the first region has a region where the first flow passage 11 is adjacent only to the third flow passage 13. Thus, the first region is configured such that the Eng coolant and the T/M oil can exchange heat with each other without being influenced by the Eng oil.

The second region includes at least one five-layer flow passage group in which the second flow passage 12, the third flow passage 13, the second flow passage, the first flow passage 11 and the second flow passage 12 are sequentially adjacent to one another, and the respective flow passages are arranged such that the Eng coolant and the Eng oil exchange heat with each other and that the Eng oil and the T/M oil exchange heat with each other. As shown in FIG. 1, the second region in the present embodiment of the disclosure is constituted of a total of eight layers, namely, the second flow passage 12, the third flow passage 13, the second flow passage 12, the first flow passage 11, the second flow passage 12, the third flow passage 13, the second flow passage 12 and the first flow passage 11, which are arranged in this sequence from above.

As shown in FIG. 1, the first region and the second region are adjacent to each other in the lamination direction. Specifically, the first flow passage 11 that is arranged in the lowermost layer (the fifth layer) of the first region, and the second flow passage 12 that is arranged in the uppermost layer (the sixth layer) of the second region are arranged adjacently to each other.

Flow directions of the fluids in the respective flow passages of the heat exchanger 1 will be described hereinafter with reference to FIG. 2. In the drawing, each arrow indicated by a solid line represents a flow direction F11 of the Eng coolant in the first flow passages 11, each arrow indicated by an alternate long and two short dashes line represents a flow direction F12 of the Eng oil in the second flow passages 12, and each arrow indicated by an alternate long and short dash line represents a flow direction F13 of the T/M oil in the third flow passages 13. Incidentally, "the flow direction" in the present embodiment of the disclosure means a direction from an inflow hole of each of the flow passages toward an outflow hole thereof (see FIGS. 3 and 4, which will be described later).

Figure 2:
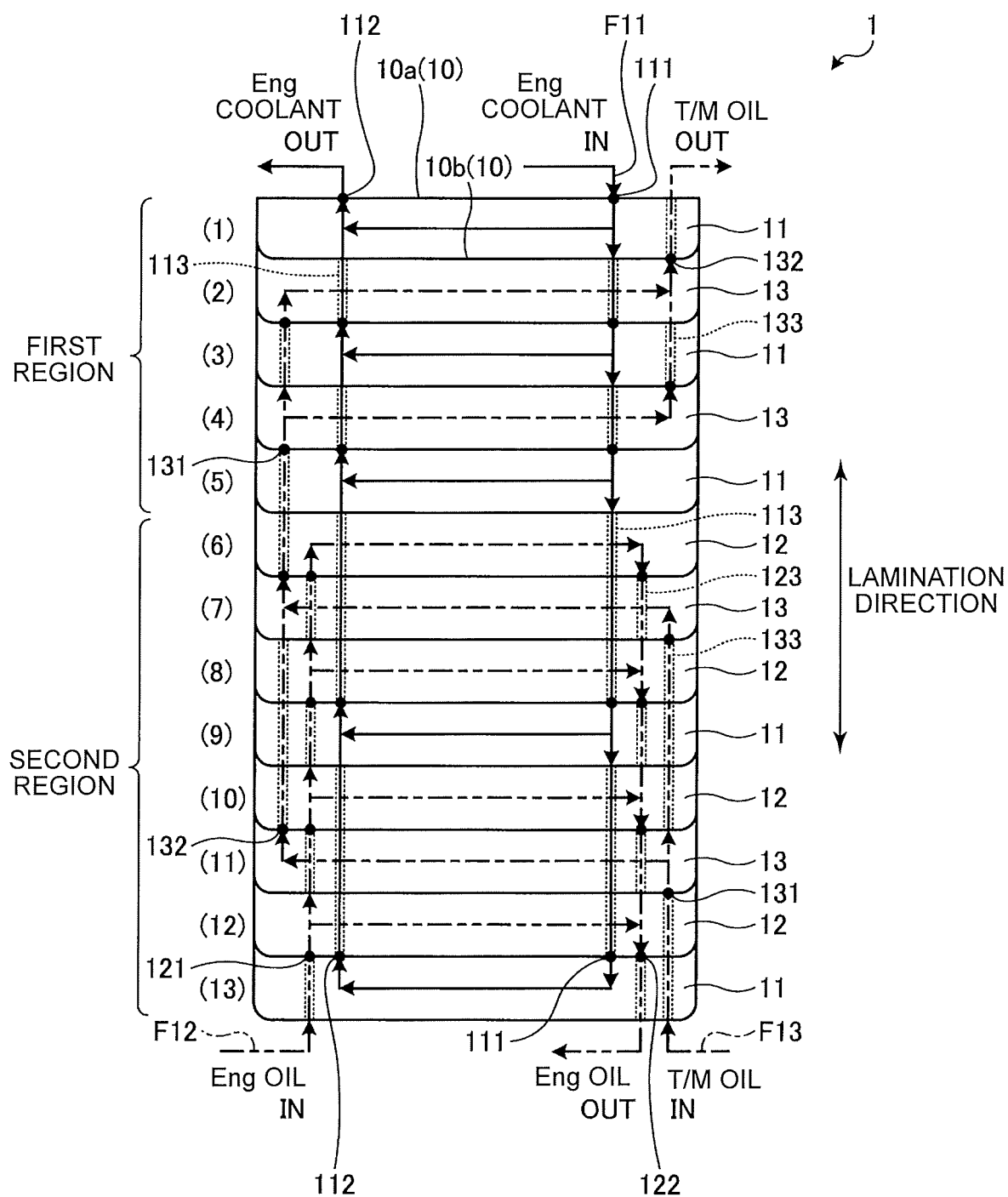
FIG. 2 is a view schematically showing flow directions of respective fluids and a sequence of heat exchange in the heat exchanger for the vehicle according to the first embodiment of the disclosure.

Besides, in FIG. 2, black circles on routes of the arrows indicated by the solid lines, the arrows indicated by the alternate long and two short dashes lines and the arrows indicated by the alternate long and short dash lines conceptually represent inflow holes 111, 121 and 131 and outflow holes 112, 122 and 132 for the fluids respectively. Besides, in the drawing, broken lines that partially surround the routes of the arrows indicated by the solid lines, the arrows indicated by the alternate long and two short dashes lines and the arrows indicated by the alternate long and short dash lines conceptually represent interlayer communication passages 113, 123 and 133 for the fluids respectively.

Incidentally, "the inflow hole" in the present embodiment of the disclosure means a hole that is formed most upstream in the flow direction of a fluid, among holes through which the fluid is introduced into a flow passage. For example, in addition to the first inflow hole 111, a hole (not shown) for introducing the Eng coolant from the first flow passage 11 in the third layer into the first flow passage 11 in the first layer is formed through the first flow passage 11 in the first layer of FIG. 2. In the present embodiment of the disclosure, however, the hole that is located more upstream (see the black circle) is the first inflow hole 111.

Besides, "the outflow hole" in the present embodiment of the disclosure means a hole that is formed most downstream in the flow direction of a fluid, among holes through which the fluid is discharged from a flow passage. For example, in addition to the first outflow hole 112, a hole (not shown) for discharging the Eng coolant from the first flow passage 11 in the first layer to the first flow passage 11 in the third layer is formed through the first flow passage 11 in the first layer of FIG. 2. In the present embodiment of the disclosure, however, the hole that is located more downstream (see the black circle) is the first outflow hole 112.

The first inflow hole 111 for causing the Eng coolant to flow from the engine or another flow passage into the first flow passage 11 and the first outflow hole 112 for causing the Eng coolant to flow out from the first flow passage 11 to the engine or another flow passage are formed through the two plates 10 (the flat plate 10a and the dish-shaped plate 10b) constituting each of the first flow passages 11. As shown specifically in FIG. 2, the first inflow hole 111 and the first outflow hole 112 are formed on both right and left sides of the plate 10 constituting an upper surface of each of the first flow passages 11. Incidentally, in the drawing, only some of the first inflow holes 111 and the first outflow holes 112 are denoted by their reference numerals respectively, and no reference numerals are assigned to the other first inflow holes and the other first outflow holes.

The Eng coolant that has flowed from the first inflow hole 111 in the first layer (the first flow passage 11) into the first flow passage 11 branches off and flows into the first flow passages 11 in the third, fifth, ninth and thirteenth layers. Subsequently, the Eng coolant flows through the first flow passages in the respective layers in a direction perpendicular to the lamination direction (a planar direction of the plates 10), then merges, and flows out from the first outflow hole 112 in the first layer (the first flow passage 11) to the outside of the heat exchanger 1 (an engine).

An interlayer communication passage (which is, for example, cylindrical) that allows fluid to flow into and out from the flow passages that are arranged above and below each of the first flow passages 11 is formed in such a manner as to penetrate the first flow passage 11, between the two plates 10 (the flat plate 10a and the dish-shaped plate 10b) constituting the first flow passage 11. For example, an interlayer communication passage 123 for the Eng oil is formed between the plates 10 constituting the first flow passages 11 in the ninth and thirteenth layers. Besides, interlayer communication passages 133 for the T/M oil are formed between the plates 10 constituting the first flow passages 11 in the first, third, fifth, ninth and thirteenth layers, respectively.

A second inflow hole 121 for causing the Eng oil to flow from the engine or another flow passage into the second flow passage 12, and a second outflow hole 122 for causing the Eng oil to flow out from the second flow passage 12 to the engine or another flow passage are formed through the two plates 10 (the dish-shaped plates 10b) constituting each of the second flow passages 12. As shown specifically in FIG. 2, the second inflow hole 121 and the second outflow hole 122 are formed on both right and left sides of the plate 10 constituting the lower surface of the second flow passage 12. Incidentally, only one of the second inflow holes 121 and one of the second outflow holes 122 are denoted by their reference numerals respectively, and no reference numerals are assigned to the other second inflow holes 121 and the other second outflow holes 122.

The Eng oil that has flowed from the second inflow hole 121 in the twelfth layer (the second flow passage 12) into the second flow passage 12 via the interlayer communication passage 123 branches off and flows into the second flow passages 12 in the tenth, eighth and sixth layers. Subsequently, the Eng oil flows through the second flow passages 12 in the respective layers in the direction perpendicular to the lamination direction respectively, then merges, and flows out from the second outflow hole 122 in the twelfth layer (the second flow passage 12) to the outside of the heat exchanger 1 (the engine) via the interlayer communication passage 123.

An interlayer communication passage (which is, for example, cylindrical) that allows fluid to flow into and out from the flow passages that are arranged above and below each of the second flow passages 12 is formed in such a manner as to penetrate the second flow passage 12, between the two plates 10 (the dish-shaped plates 10b) constituting the second flow passage 12. For example, the interlayer communication passage 113 for the Eng coolant and the interlayer communication passage 133 for the T/M oil are formed between the plates 10 constituting each of the second flow passages 12 in the sixth, eighth, tenth and twelfth layers.

A third inflow hole 131 for causing the T/M oil to flow from a transmission or another flow passage into each of the third flow passages 13, and a third outflow hole 132 for causing the T/M oil to flow out from each of the third flow passages 13 to the transmission or another flow passage are formed through the two plates 10 (the dish-shaped plates 10b) constituting each of the third flow passages 13. As shown specifically in FIG. 2, the third inflow hole 131 is formed through the plate constituting the lower surface of each of the third flow passages 13. Besides, as shown specifically in the drawing, the third outflow hole 132 is formed through the plate 10 constituting the upper surface of each of the third flow passages 13. Incidentally, in the drawings, only some of the third inflow holes 131 and the third outflow holes 132 are denoted by their reference numerals respectively, and no reference numerals are assigned to the other third inflow holes and the other third outflow holes.

The T/M oil that has flowed from the third inflow hole 131 in the eleventh layer (the third flow passage 13) into the third flow passage 13 via the interlayer communication passage 133 branches off and flows into the third flow passage 13 in the seventh layer. Subsequently, the T/M oil flows through the third flow passages 13 in the respective layers in the direction perpendicular to the lamination direction, and then merges. Subsequently, the T/M oil branches off and flows into the third flow passages 13 in the fourth and second layers respectively. Subsequently, the T/M oil flows through the third flow passages 13 in the respective layers in the direction perpendicular to the lamination direction, then merges, and flows out from the third outflow hole 132 in the second layer (the third flow passage 13) to the outside of the heat exchanger 1 (the transmission) via the interlayer communication passage 133.

An interlayer communication passage (which is, for example, cylindrical) that allows fluid to flow into and out from the flow passages that are arranged above and below each of the third flow passages 13 is formed in such a manner as to penetrate the third flow passage 13, between the two plates 10 (the dish-shaped plates 10b) constituting the third flow passage 13. For example, the interlayer communication passages 113 for the Eng coolant are formed between the plates 10 constituting the third flow passages 13 in the eleventh, seventh, fourth and second layers respectively. Besides, the interlayer communication passages 123 for the Eng oil are formed between the plates 10 constituting the third flow passages 13 in the eleventh and seventh layers respectively.

Figure 3:
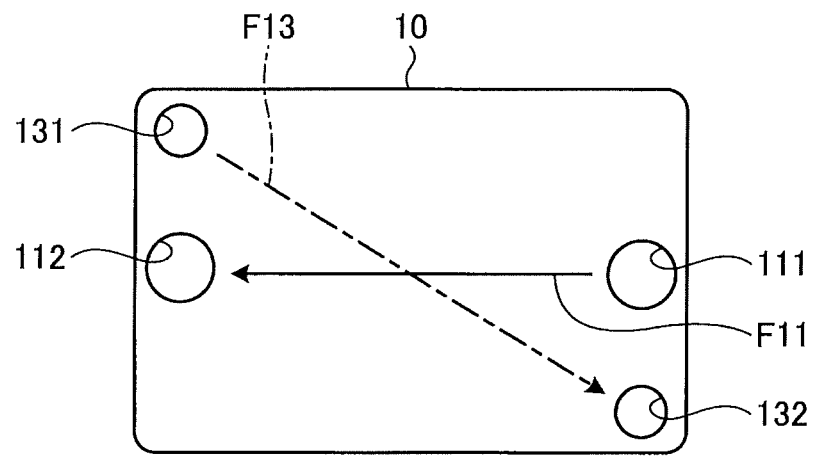
FIG. 3 is a view schematically showing positions of inflow holes and outflow holes for the respective fluids in each plate constituting a first region among respective flow passages of the heat exchanger for the vehicle according to the first embodiment of the disclosure.

A relationship in flow direction of the fluids among the respective flow passages of the heat exchanger 1 will be described hereinafter with reference to FIGS. 3 and 4. FIG. 3 shows, in a projected manner, the positions of the inflow holes and the outflow holes of the respective flow passages in the first region, on each of the plates 10 in a plan view along the lamination direction, in the heat exchanger 1. Besides, FIG. 4 shows, in a projected manner, the positions of the inflow holes and the outflow holes of the respective flow passages in the second region, on each of the plates 10 in a plan view along the lamination direction, in the heat exchanger 1.

Figure 4:
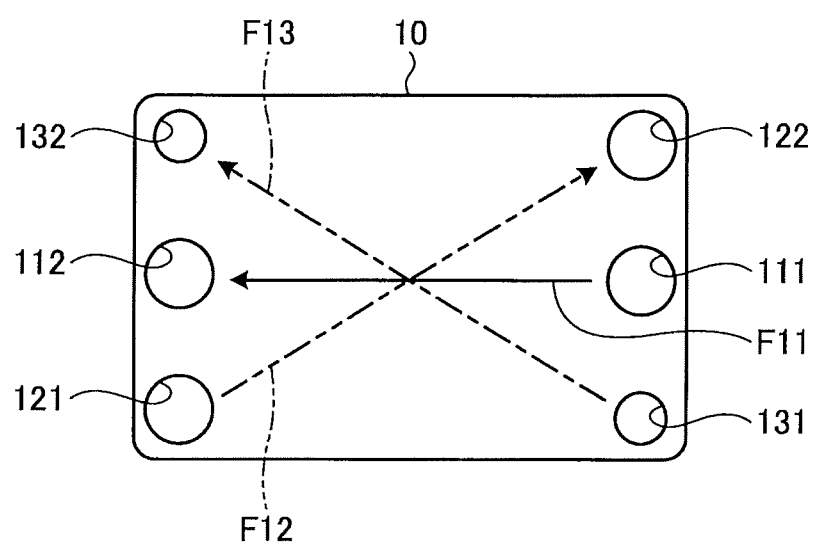
FIG. 4 is a view schematically showing positions of inflow holes and outflow holes for the respective fluids in each plate constituting a second region among the respective flow passages of the heat exchanger for the vehicle according to the first embodiment of the disclosure.

Besides, in FIGS. 3 and 4, each of arrows indicated by solid lines represents a principal line of the flow direction F11 (a representative flow direction) of the Eng coolant in the case where the first inflow hole 111 and the first outflow hole 112 are joined to each other at a shortest distance. Besides, an arrow indicated by an alternate long and two short dashes line represents a principal line of the flow direction F12 of the Eng oil in the case where the second inflow hole 121 and the second outflow hole 122 are joined to each other at a shortest distance. Moreover, each of arrows indicated by alternate long and short dash lines represents a principal line of the flow direction F13 of the T/M oil in the case where the third inflow hole 131 and the third outflow hole 132 are joined to each other at a shortest distance.

Inflow holes and outflow holes for the Eng coolant, the Eng oil and the T/M oil are formed in each of the plates 10 constituting the respective flow passages of the heat exchanger 1, such that the flow directions of fluids between adjacent ones of the flow passages in the lamination direction are opposed to each other.

As shown in, for example, FIG. 3, the respective inflow holes and the respective outflow holes are formed through each of the plates 10 constituting the first flow passage 11 and the third flow passage 13 that are included in the first region among the respective flow passages of the heat exchanger 1, at such positions that the flow direction F11 of the Eng coolant in the first flow passage 11 and the flow direction F13 of the T/M oil in the third flow passage 13 are opposed to each other.

It should be noted herein that the foregoing state of "being opposed to each other" means a state where principal lines of flow directions of different fluids intersect with each other, or a state where principal lines of flow directions of different fluids are opposed to each other, as shown in FIG. 3. Incidentally, a state of not being opposed to each other, namely, a state where principal lines of flow directions of different fluids neither intersect with each other nor are opposed to each other is referred to as a state of "parallel flow".

It is determined whether or not the flow direction F11 of the Eng coolant and the flow direction F13 of the T/M oil are opposed to each other, depending on a positional relationship among the respective inflow holes and the respective outflow holes that are formed through each of the plates 10. That is, as shown in FIG. 3, the first inflow hole 111, the first outflow hole 112, the third inflow hole 131 and the third outflow hole 132 are formed through the plate 10 at such positions that a straight line joining the first inflow hole 111 and the first outflow hole 112 to each other (the principal line of the flow direction F11 of the Eng coolant) and a straight line joining the third inflow hole 131 and the third outflow hole 132 to each other (the principal line of the flow direction F13 of the T/M oil) intersect with each other.

More specifically, the first inflow hole 111 and the first outflow hole 112 are formed at widthwise central positions of two opposed sides of each of the plates 10 in a plan view. Besides, the third inflow hole 131 and the third outflow hole 132 are formed at diagonal positions through corner portions (round corner portions) of each of the plates 10 in a plan view.

As described hitherto, in the first region among the respective flow passages of the heat exchanger 1, the principal line of the flow direction F11 of the Eng coolant and the principal line of the flow direction F13 of the T/M oil intersect with each other, so the flow direction F11 of the Eng coolant and the flow direction F13 of the T/M oil are opposed to each other (e.g., see the first and second layers in FIG. 2). By adopting a configuration in which the flow directions of adjacent fluids are thus opposed to each other, the relative amount of heat that can be exchanged between the adjacent fluids per unit time and the number of opportunities to enable heat exchange between the adjacent fluids per unit time can be increased in comparison with the case of parallel flow. Thus, the difference in temperature between adjacent fluids can be rapidly reduced, and heat exchange can be more efficiently carried out than in the case of parallel flow.

As shown in FIG. 4, the respective inflow holes and the respective outflow holes are formed through each of the plates 10 constituting the first flow passage 11, the second flow passage 12 and the third flow passage 13 that are included in the second region among the respective flow passages of the heat exchanger 1, at such positions that the flow direction F11 of the Eng coolant in the first flow passage 11, the flow direction F12 of the Eng oil in the second flow passage 12 and the flow direction F13 of the T/M oil in the third flow passage 13 are opposed to one another.

It is determined whether or not the flow direction F11 of the Eng coolant, the flow direction F12 of the Eng oil and the flow direction F13 of the T/M oil are opposed to one another, depending on a positional relationship among the respective inflow holes and the respective outflow holes that are formed through each of the plates 10. That is, the first inflow hole 111, the first outflow hole 112, the second inflow hole 121, the second outflow hole 122, the third inflow hole 131 and the third outflow hole 132 are formed through each of the plates 10 at such positions that a straight line joining the first inflow hole 111 and the first outflow hole 112 to each other (the principal line of the flow direction F11 of the Eng coolant), a straight line joining the second inflow hole 121 and the second outflow hole 122 to each other (the principal line of the flow direction F12 of the Eng oil), and a straight line joining the third inflow hole 131 and the third outflow hole 132 to each other (the principal line of the flow direction F13 of the T/M oil) intersect with one another, as shown in FIG. 4.

More specifically, the first inflow hole 111 and the first outflow hole 112 are formed at widthwise central positions of two opposed sides of each of the plates 10 in a plan view, respectively. Besides, the second inflow hole 121 and the second outflow hole 122 are formed at diagonal positions through corner portions (round corner portions) of each of the plates 10 in a plan view. Besides, the third inflow holes 131 and the third outflow holes 132 are formed at diagonal positions through corner portions (round corner portions) of each of the plates 10 in a plan view.

For example, in the rectangular plate 10 as shown in FIG. 4, when the second inflow hole 121 and the second outflow hole 122 are formed at diagonal positions through certain ones of four corners, the third inflow hole 131 and the third outflow hole 132 are formed at diagonal positions through certain ones of the four corners in such a manner as not to overlap with the second inflow hole 121 and the second outflow hole 122 respectively in a plan view.

As described hitherto, the crossing amount of the Eng oil and the T/M oil can be made larger than in the case where the principal line of the flow direction F12 of the Eng oil and the principal line of the flow direction F13 of the T/M oil do not intersect with each other (e.g., the respective inflow holes and the respective outflow holes are arranged at the four corners such that the principal line of the flow direction F12 and the principal line of the flow direction F13 are parallel to each other), by arranging the second inflow hole 121, the second outflow hole 122, the third inflow hole 131 and the third outflow hole 132 at the four diagonal corners of each of the plates 10 and ensuring that the principal line of the flow direction F12 of the Eng oil and the principal line of the flow direction F13 of the T/M oil intersect with each other. Accordingly, heat can be efficiently exchanged between the Eng oil and the T/M oil.

As described hitherto, in the second region among the respective flow passages of the heat exchanger 1, the principal line of the flow direction F11 of the Eng coolant, the principal line of the flow direction F12 of the Eng oil, and the principal line of the flow direction F13 of the T/M oil intersect with one another. Thus, the flow direction F11 of the Eng coolant and the flow direction F12 of the Eng oil are opposed to each other (e.g., see the thirteenth and twelfth layers in FIG. 2), and the flow direction F12 of the Eng oil and the flow direction F13 of the T/M oil are opposed to each other (e.g., see the twelfth and eleventh layers in the drawing). Accordingly, heat exchange can be more efficiently carried out than in the case where the respective flow directions are parallel to one another.

It should be noted herein that the third inflow hole 131 into which the T/M oil flows from the transmission is located on the second region side (see the third inflow hole 131 in the eleventh layer) and the third outflow hole 132 from which the T/M oil flows out to the transmission is located on the first region side (see the third outflow hole 132 in the second layer) in the heat exchanger 1 as shown in FIG. 2. Therefore, the third flow passage 13 included in the second region is located upstream of the third flow passage 13 included in the first region in the flow direction of the T/M oil flowing through the heat exchanger 1. Accordingly, when focusing attention on heat exchange between the T/M oil and the other fluids in the heat exchanger 1, the T/M oil and the Eng oil first exchange heat with each other in the second region, and then the T/M oil and the Eng coolant exchange heat with each other in the first region as shown in FIG. 2.

Incidentally, heat exchange in the aforementioned second region indicates, for example, heat exchange in the twelfth layer (the second flow passage 12) to the tenth layer (the second flow passage 12) and heat exchange in the eighth layer (the second flow passage 12) to the sixth layer (the second flow passage 12) in FIG. 2. Besides, heat exchange in the aforementioned first region indicates, for example, heat exchange in the fifth layer (the first flow passage 11) to the first layer (the first flow passage 11) in the drawing.

Figure 5:
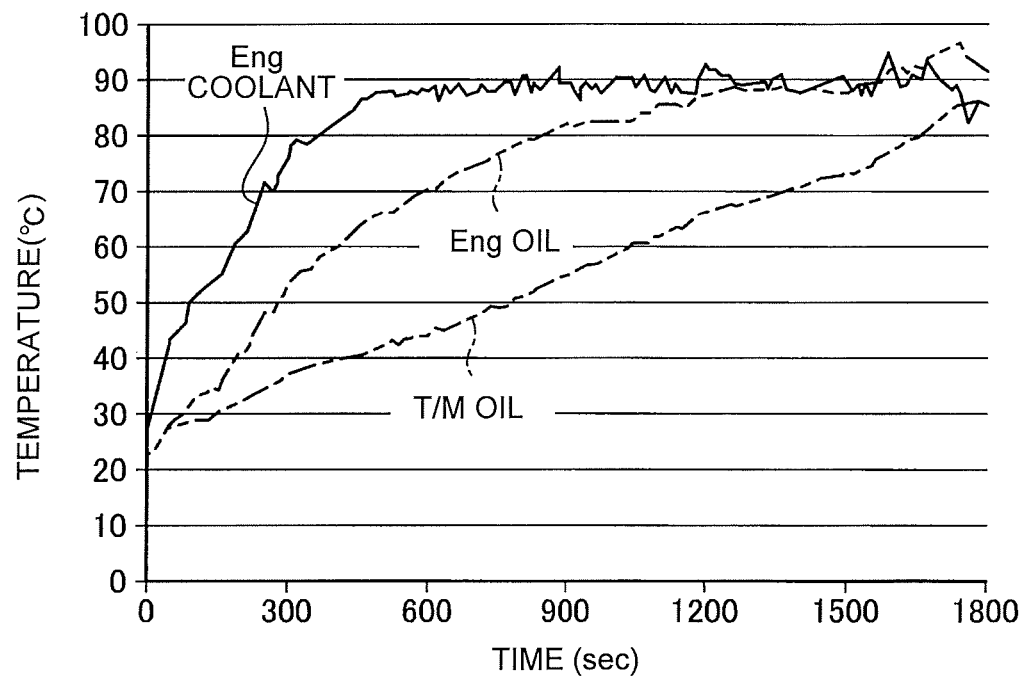
FIG. 5 is a graph showing how temperatures of the respective fluids change at a time of cold state before the completion of warm-up (during warm-up) of an engine and a transmission in a vehicle that is mounted with the heat exchanger for the vehicle.

It should be noted herein that FIG. 5 shows how the temperatures of the respective fluids change at the time of cold state before the completion of warm-up (during warm-up) of an engine and a transmission in a general vehicle. As shown in the drawing, on the whole, among the temperatures of the respective fluids before the completion of warm-up, the temperature of the Eng coolant is highest, the temperature of the Eng oil is second highest, and the temperature of the T/M oil is lowest. Under this condition, it is preferable to first exchange heat between the T/M oil and the Eng oil, which are different in temperature from each other by a small value, and then exchange heat between the T/M oil and the Eng coolant, among the three fluids. The amount of heat accumulated in the T/M oil can be made larger than in the case where heat is first exchanged between the T/M oil and the Eng coolant, which are different in temperature from each other by a large value, and then heat is exchanged between the T/M oil and the Eng oil, by exchanging heat among the respective fluids in this sequence. Accordingly, the temperature of the T/M oil can be more rapidly and efficiently raised than in the case of changes in temperature shown in FIG. 5.

For example in FIG. 5, the temperature of the T/M oil is raised to about 85° C. at a time point of 1800 sec. However, the temperature of the T/M oil can be raised to about 85° C. at a time point prior to 1800 sec, by first exchanging heat between the T/M oil and the Eng oil and then exchanging heat between the T/M oil and the Eng coolant as described above. Besides, the warm-up of the transmission is promoted and the amount of friction is reduced by exchanging heat among the respective fluids in the aforementioned sequence. Therefore, fuel economy is also improved.

Figure 6:
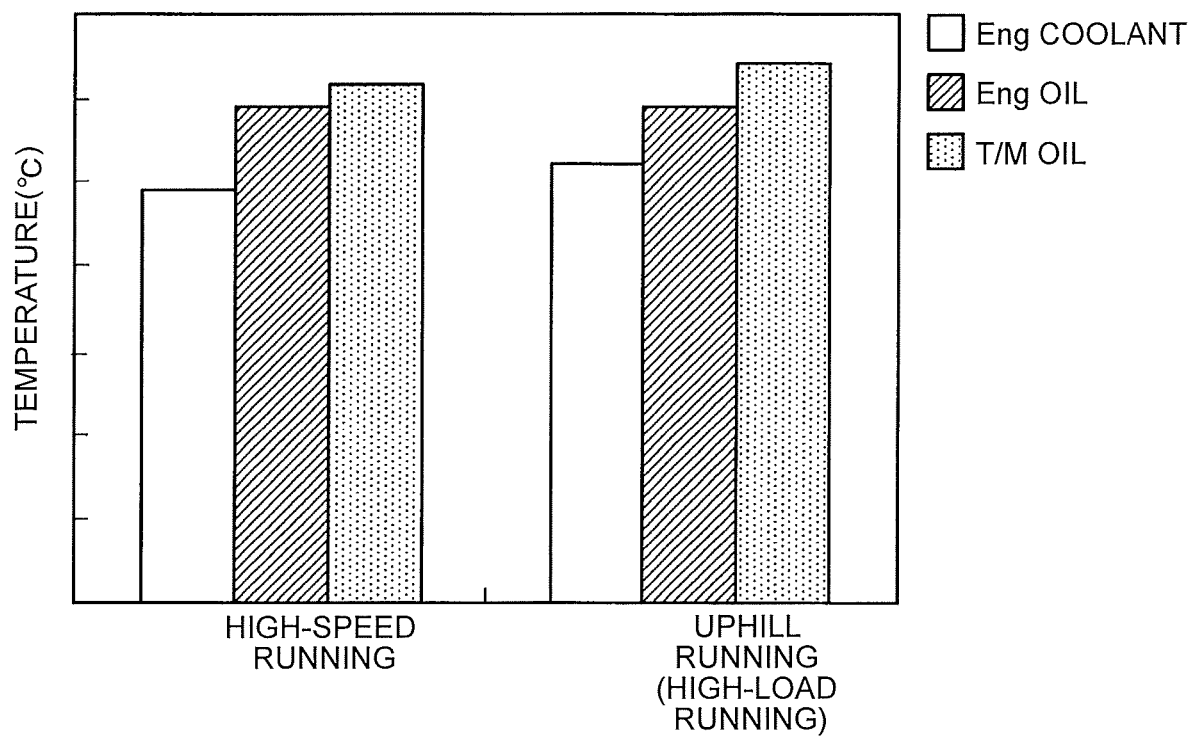
FIG. 6 is a graph showing temperatures of the respective fluids at a time of hot state after warm-up of the engine and the transmission in the vehicle that is mounted with the heat exchanger for the vehicle.

Besides, FIG. 6 shows exemplary temperatures of the respective fluids at the time of hot state after the warm-up of an engine and a transmission in a general vehicle. As shown in the drawing, among the temperatures of the respective fluids in the case where the vehicle runs at high speed or runs uphill (runs at high load), the temperature of the T/M oil is highest, the temperature of the Eng oil is second highest, and the temperature of the Eng coolant is lowest. Under this condition, it is preferable to first exchange heat between the T/M oil and the Eng oil, which are different in temperature from each other by a small value, and then exchange heat between the T/M oil and the Eng coolant, among the three fluids. The amount of heat discharged from the T/M oil can be made large, and the temperature of the T/M oil can be efficiently lowered, by exchanging heat among the respective fluids in this sequence.

For the foregoing reason, in the heat exchanger 1, the third flow passage 13 included in the second region is arranged upstream of the third flow passage 13 included in the first region in the flow direction of the T/M oil, as described hereinbefore. Thus, heat is first exchanged between the T/M oil and the Eng oil, which are different in temperature from each other by a small value, in the second region, and then heat is exchanged between the T/M oil, which has exchanged heat with the Eng oil, and the Eng coolant in the first region. In this manner, the temperature of the T/M oil whose flow rate is low can be efficiently raised or lowered.

The heat exchanger 1 configured as described above has the region where the first flow passage 11 is adjacent only to that one of the second flow passage 12 and the third flow passage 13 through which the fluid flows at lower flow rate (the third flow passage 13) in the lamination direction. Therefore, in this region, heat can be exchanged between the fluid whose flow rate is low (the T/M oil) and the Eng coolant without being influenced by the other fluid (the Eng oil). Accordingly, even in the case where the heat exchanger 1 is mounted in a vehicle having a power train in which the flow rate of the T/M oil is lower than the flow rate of the Eng oil, the amount of heat exchange between the T/M oil and the Eng coolant can be increased, and the temperature of the T/M oil can be sufficiently raised or lowered.

In the heat exchanger of the foregoing Japanese Patent Application Publication No. 2013-113578 (JP 2013-113578 A), the three fluids simultaneously exchange heat with one another. It is therefore difficult, for example, to set the amount of heat exchange between the T/M oil and the Eng coolant to an optimal value (a desired specification). On the other hand, in the heat exchanger 1 according to the present embodiment of the disclosure, the specification of the amount of heat exchange between the T/M oil and the Eng coolant can be easily changed by, for example, increasing/reducing the number of repetition of the first flow passages 11 and the third flow passages 13 in the first region. That is, the heat exchanger 1 is designed as a three-phase heat exchanger, but has the first region where only the two fluids exchange heat with each other. Therefore, the amount of heat exchange between the two fluids can be easily adjusted by increasing/reducing the number of layers of the respective flow passages in this region.

The heat exchanger for the vehicle according to the second embodiment of the disclosure is designed to be mounted in, for example, a vehicle having a power train in which the flow rate of the Eng oil is lower than the flow rates of the Eng coolant and the T/M oil. This heat exchanger for the vehicle aims mainly at increasing the amount of heat exchange of the Eng oil whose flow rate is low.

Figure 7:
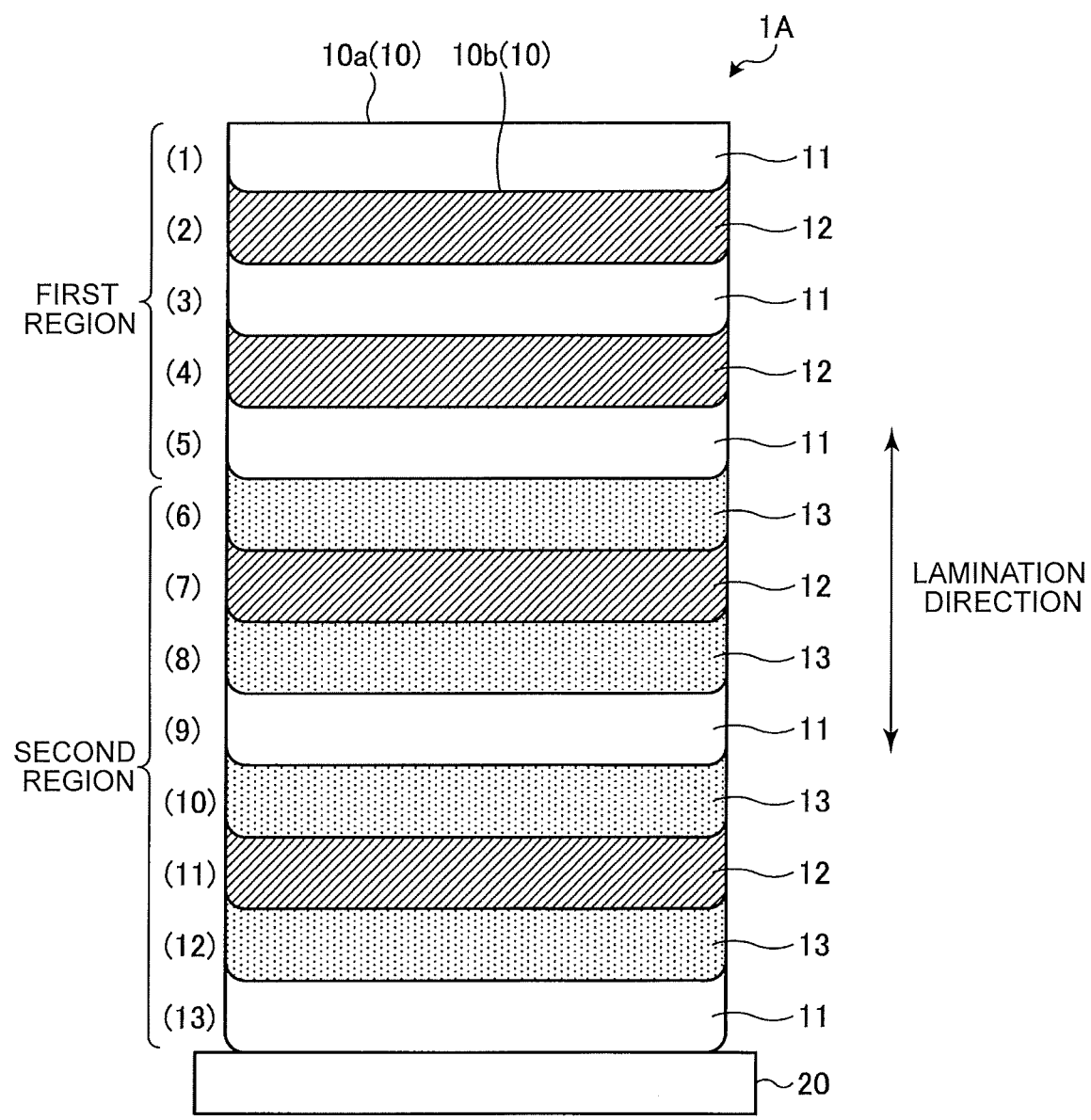
FIG. 7 is a view schematically showing the configuration of a heat exchanger for the vehicle according to the second embodiment of the disclosure.

As shown in FIG. 7, a heat exchanger 1A for a vehicle is constituted by laminating the plurality of the plates 10. In this respect, the heat exchanger 1A is identical to the heat exchanger for the vehicle according to the foregoing first embodiment of the disclosure. On the other hand, as shown in the drawing, the heat exchanger 1A is different from the heat exchanger for the vehicle according to the foregoing first embodiment of the disclosure in the arrangement of flow passages in the first region and the second region. Incidentally, in the following description, components common to those of the first embodiment of the disclosure will be denoted by the reference symbols respectively, and the description thereof will be omitted.

As shown in FIG. 7, the heat exchanger 1A is constituted of a total of thirteen layers. The first flow passages 11 are arranged in the first, third, fifth, ninth and thirteenth layers, the second flow passages 12 are arranged in the second, fourth, seventh and eleventh layers, and the third flow passages 13 are arranged in the sixth, eighth, tenth and twelfth layers. As described hitherto, the positions where the second flow passages 12 are arranged and the positions where the third flow passages 13 are arranged in the present embodiment of the disclosure are reverse to those in the first embodiment of the disclosure, respectively.

The heat exchanger 1A has two regions, namely, a first region and a second region, as regions where a plurality of fluids exchange heat with one another. The first region aims at increasing the amount of heat exchange between the Eng oil and the Eng coolant. The first region includes at least one three-layer flow passage group in which the first flow passage 11, the second flow passage 12 and the first flow passage 11 are sequentially adjacent to one another. The first flow passages 11 and the second flow passages 12 are alternately laminated on one another in the lamination direction. As shown in FIG. 7, the first region in the present embodiment of the disclosure is constituted of a total of five layers, namely, the first flow passage 11, the second flow passage 12, the first flow passage 11, the second flow passage 12 and the first flow passage 11, which are arranged in this sequence from above.

Besides, as shown in FIG. 7, the first region includes a region where the first flow passage is adjacent only to that one of the second flow passage 12 and the third flow passage 13 through which the fluid flows at lower flow rate. That is, the first region includes the first flow passage 11 that is arranged in such a manner as to be adjacent to the second flow passage 12 on one side in the lamination direction and not to be adjacent to the third flow passage 13 on the other side in the lamination direction.

For example, the first flow passage 11 in the first layer is adjacent to the second flow passage 12 in the second layer only on one side in the lamination direction (the lower surface side), and is not adjacent to any other flow passage on the other side in the lamination direction (the upper surface side). Besides, the first flow passage 11 in the third layer is adjacent to the second flow passages 12 in the second and fourth layers on both the sides in the lamination direction (both the surface sides) respectively. As described hitherto, the first region has a region where the first flow passage 11 is adjacent only to the second flow passage 12. Thus, the heat exchanger 1A is configured such that the Eng coolant and the Eng oil can exchange heat with each other without being influenced by the T/M oil.

The second region includes at least one five-layer flow passage group in which the third flow passage 13, the second flow passage 12, the third flow passage 13, the first flow passage 11 and the third flow passage 13 are sequentially adjacent to one another. The respective flow passages are arranged such that the Eng coolant and the T/M oil exchange heat with each other and that the Eng oil and the T/M oil exchange heat with each other. As shown in FIG. 7, the second region in the present embodiment of the disclosure is constituted of a total of eight layers, the third flow passage 13, the second flow passage 12, the third flow passage 13, the first flow passage 11, the third flow passage 13, the second flow passage 12, the third flow passage 13 and the first flow passage 11, which are arranged in this sequence from above.

As shown in FIG. 7, the first region and the second region are adjacent to each other in the lamination direction. Specifically, the first flow passage 11 that is arranged in the lowermost layer of the first region (the fifth layer), and the third flow passage 13 that is arranged in the uppermost layer of the second region (the sixth layer) are arranged adjacently to each other.

Flow directions of the fluids in the respective flow passages of the heat exchanger 1A will be described hereinafter with reference to FIG. 8.

The Eng coolant that has flowed from the first inflow hole 111 in the first layer (the first flow passage 11) into the first flow passage 11 branches off and flows into the first flow passages 11 in the third, fifth, ninth and thirteenth layers. Subsequently, the Eng coolant flows through the first flow passages 11 in the respective layers in the direction perpendicular to the lamination direction, then merges, and flows out from the first outflow hole 112 in the first layer (the first flow passage 11) to the outside of the heat exchanger 1A (the engine).

The Eng oil that has flowed from the second inflow hole 121 in the eleventh layer (the second flow passage 12) into the second flow passage 12 via the interlayer communication passage 123 branches off and flows into the second flow passages 12 in the seventh, fourth and second layers. Subsequently, the Eng oil flows through the second flow passages 12 in the respective layers in the direction perpendicular to the lamination direction, then merges, and flows out from the second outflow hole 122 in the eleventh layer (the second flow passage 12) to the outside of the heat exchanger 1A (the engine) via the interlayer communication passage 123.

The T/M oil that has flowed from the third inflow hole 131 in the twelfth layer (the third flow passage 13) into the third flow passage 13 via the interlayer communication passage 133 branches off and flows into the third flow passage 13 in the tenth layer. Then, the T/M oil flows through the third flow passages 13 in the respective layers in the direction perpendicular to the lamination direction, and then merges. Subsequently, the T/M oil branches off and flows into the third flow passages 13 in the eighth and sixth layers. Subsequently, the T/M oil flows through the third flow passages 13 in the respective layers in the direction perpendicular to the lamination direction, then merges, and flows out from the third outflow hole 132 in the sixth layer (the third flow passage 13) to the outside of the heat exchanger 1A (the transmission) via the interlayer communication passage 133.

Figure 9:
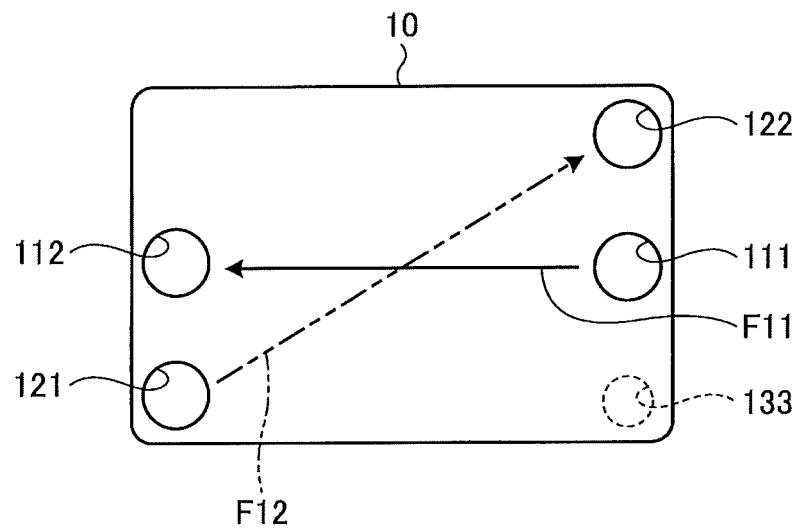
FIG. 9 is a view schematically showing positions of inflow holes and outflow holes for the respective fluids in each plate constituting a first region among respective flow passages of the heat exchanger for the vehicle according to the second embodiment of the disclosure.
Figure 10:
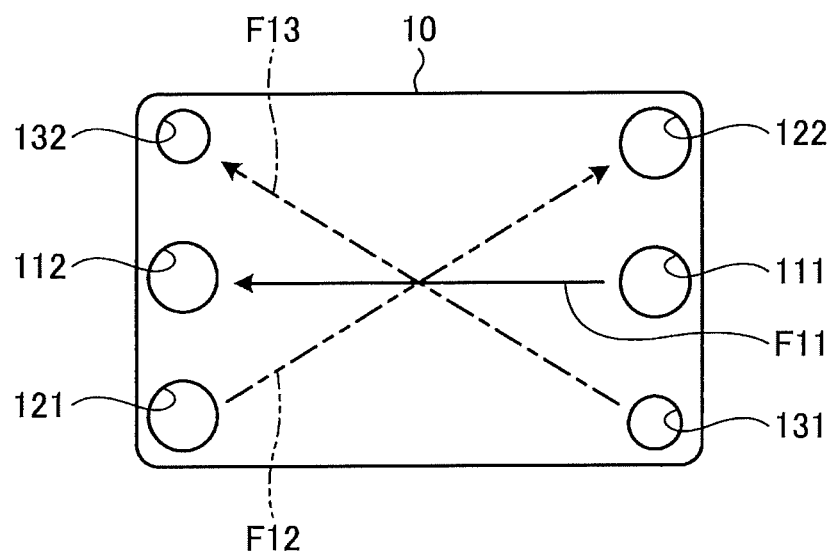
FIG. 10 is a view schematically showing positions of inflow holes and outflow holes for the respective fluids in each plate constituting a second region among the respective flow passages of the heat exchanger for the vehicle according to the second embodiment of the disclosure.

A relationship in the flow direction of fluid among the respective flow passages of the heat exchanger 1A will be described hereinafter with reference to FIGS. 9 and 10. FIG. 9 shows, in a projected manner, the positions of the inflow holes and outflow holes of the respective flow passages in the first region, on the plate 10 in a plan view along the lamination direction, in the heat exchanger 1A. Besides, FIG. 10 shows, in a projected manner, the positions of the inflow holes and outflow holes of the respective flow passages in the second region, on the plate 10 in a plan view along the lamination direction, in the heat exchanger 1A.

As shown in FIG. 9, the respective inflow holes and the respective outflow holes are formed through each of the plates 10 constituting the first flow passage 11 and the second flow passage 12 that are included in the first region, among the respective flow passages of the heat exchanger 1A, such that the flow direction F11 of the Eng coolant in the first flow passage 11 and the flow direction F12 of the Eng oil in the second flow passage 12 are opposed to each other.

As shown in FIG. 9, the first inflow hole 111, the first outflow hole 112, the second inflow hole 121 and the second outflow hole 122 are formed through each of the plates 10 such that a straight line joining the first inflow hole 111 and the first outflow hole 112 to each other (the principal line of the flow direction F11 of the Eng coolant) and a straight line joining the second inflow hole 121 and the second outflow hole 122 to each other (the principal line of the flow direction F12 of the Eng oil) intersect with each other.

More specifically, the first inflow hole 111 and the first outflow hole 112 are formed at widthwise central positions of two opposed sides of each of the plates 10 in a plan view. Besides, the second inflow hole 121 and the second outflow hole 122 are formed at diagonal positions through corner portions (round corner portions) of each of the plates 10 in a plan view.

Figure 8:
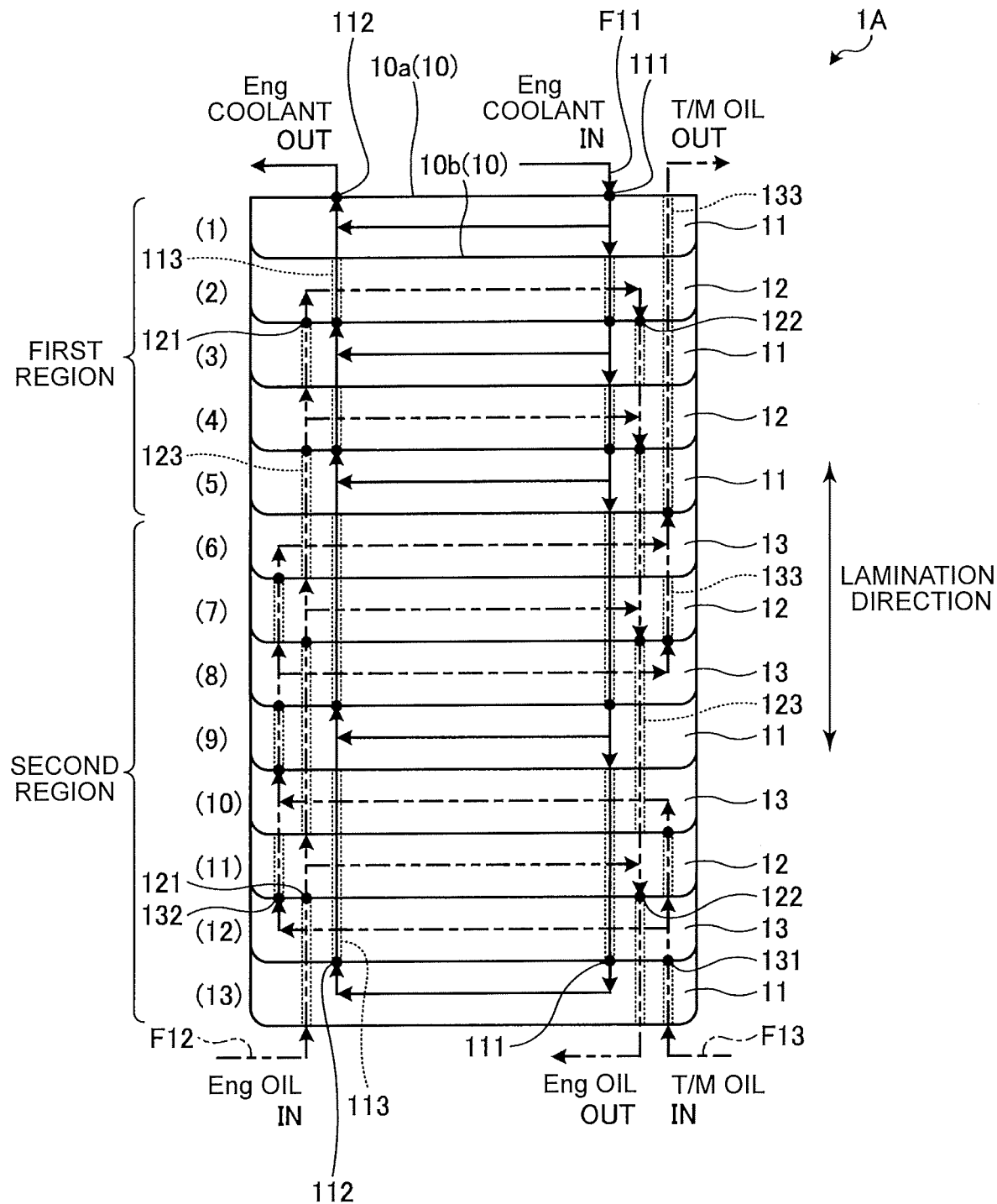
FIG. 8 is a view schematically showing flow directions of respective fluids and a sequence of heat exchange in the heat exchanger for the vehicle according to the second embodiment of the disclosure.

As described hitherto, in the first region among the respective flow passages of the heat exchanger 1A, the principal line of the flow direction F11 of the Eng coolant and the principal line of the flow direction F12 of the Eng oil intersect with each other, so the flow direction F11 of the Eng coolant and the flow direction F12 of the Eng oil are opposed to each other (e.g., see the first and second layers in FIG. 8). Accordingly, heat exchange can be more efficiently carried out than in the case where the flow directions are parallel to each other.

As shown in FIG. 10, the respective inflow holes and the respective outflow holes are formed through each of the plates 10 constituting the first flow passage 11, the second flow passage 12 and the third flow passage 13 that are included in the second region among the respective flow passages of the heat exchanger 1A, at such positions that the flow direction F11 of the Eng coolant in the first flow passage 11, the flow direction F12 of the Eng oil in the second flow passage 12 and the flow direction F13 of the T/M oil in the third flow passage 13 are opposed to one another. Incidentally, the positions of the respective inflow holes and respective outflow holes shown in the drawing are identical to those of the foregoing FIG. 4, so detailed description thereof will be omitted.

In the second region among the respective flow passages of the heat exchanger 1A, the principal line of the flow direction F11 of the Eng coolant, the principal line of the flow direction F12 of the Eng oil, and the principal line of the flow direction F13 of the T/M oil intersect with one another. Thus, the flow direction F11 of the Eng coolant and the flow direction F13 of the T/M oil are opposed to each other (e.g., see the ninth and eighth layers in FIG. 8), and the flow direction F12 of the Eng oil and the flow direction F13 of the T/M oil are opposed to each other (e.g., see the twelfth and eleventh layers in FIG. 8). Accordingly, heat exchange can be more efficiently carried out than in the case where the flow directions are parallel to each other.

The heat exchanger 1A configured as described above has the region where the first flow passage 11 is adjacent only to the second flow passage 12 in the lamination direction. Therefore, in this region, heat can be exchanged between the Eng oil and the Eng coolant without being influenced by the T/M oil. Accordingly, even in the case where the heat exchanger 1A is mounted in a vehicle having a power train in which the flow rate of the Eng oil is lower than the flow rate of the T/M oil, the amount of heat exchange between the Eng oil and the Eng coolant can be increased, and the temperature of the Eng oil can be sufficiently raised or lowered.

Besides, in the heat exchanger of the foregoing Japanese Patent Application Publication No. 2013-113578 (JP 2013-113578 A), the three fluids simultaneously exchange heat with one another. It is therefore difficult, for example, to set the amount of heat exchange between the Eng oil and the Eng coolant to an optimal value (a desired specification). On the other hand, in the heat exchanger 1A according to the present embodiment of the disclosure, the specification of the amount of heat exchange between the Eng oil and the Eng coolant can be easily changed by, for example, increasing/reducing the number of repetition of the first flow passages 11 and the second flow passages 12 in the first region.

The heat exchanger for the vehicle according to the third embodiment of the disclosure aims at increasing the amount of heat exchange between the fluid whose flow rate is low (the T/M oil or the Eng oil) and the Eng coolant as is the case with the foregoing first and second embodiments of the disclosure, and more easily changing the specification of the amount of heat exchange among the respective fluids than in the foregoing first and second embodiments of the disclosure.

Figure 11:
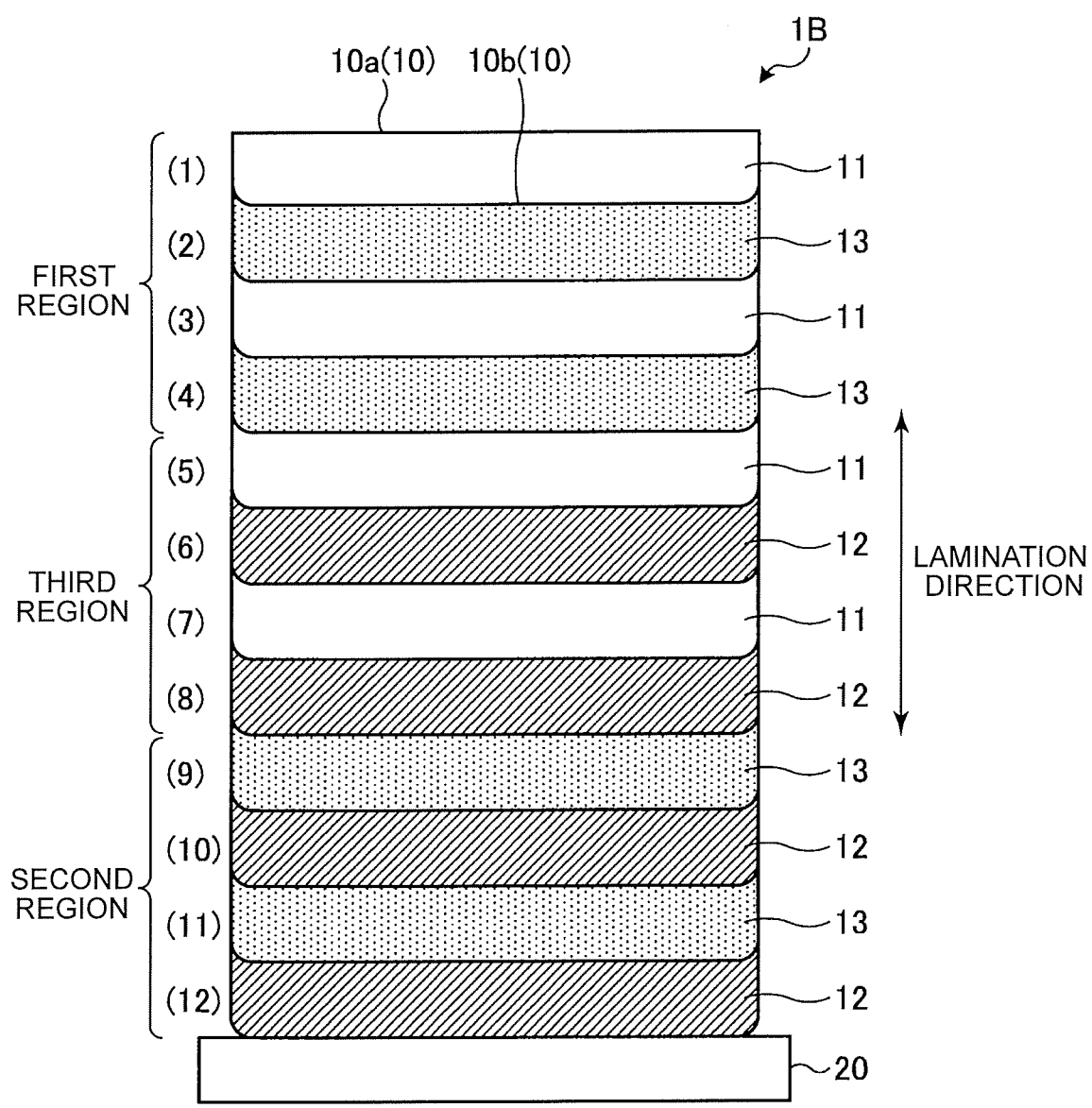
FIG. 11 is a view schematically showing the configuration of a heat exchanger for the vehicle according to the third embodiment of the disclosure.

As shown in FIG. 11, a heat exchanger 1B is constituted by laminating the plurality of the plates 10. In this respect, the heat exchanger 1B is identical to the heat exchangers 1 and 1A according to the foregoing first and second embodiments of the disclosure. On the other hand, as shown in the drawing, the heat exchanger 1B is different from the heat exchangers according to the foregoing first and second embodiments of the disclosure in the number of regions into which the respective flow passages are divided. Incidentally, in the following description, components common to those of the first and second embodiments of the disclosure will be denoted by the reference symbols respectively, and the description thereof will be omitted.

As shown in FIG. 11, the heat exchanger 1B is constituted of a total twelve layers. The first flow passages 11 are arranged in the first, third, fifth and seventh layers, the second flow passages 12 are arranged in the sixth, eighth, tenth and twelfth layers, and the third flow passages 13 are arranged in the second, fourth, ninth and eleventh layers.

The heat exchanger 1B has three regions, namely, a first region, a second region and a third region as regions where a plurality of fluids exchange heat with one another. The first region is a region that aims at increasing the amount of heat exchange between the T/M oil and the Eng coolant. The first region has at least one three-layer flow passage group in which the first flow passage 11, the third flow passage 13 and the first flow passage 11 are sequentially adjacent to one another, and the first flow passages 11 and the third flow passages 13 are alternately arranged in the lamination direction. As shown in FIG. 11, the first region in the present embodiment of the disclosure is constituted of a total of four layers, namely, the first flow passage 11, the third flow passage 13, the first flow passage 11 and the third flow passage 13, which are arranged in this sequence from above.

Besides, as shown in FIG. 11, the first region includes a region where the first flow passage 11 is adjacent only to that one of the second flow passage 12 and the third flow passage 13 through which the fluid flows at lower flow rate. That is, the first region includes the first flow passage 11 that is arranged in such a manner as to be adjacent to the third flow passage 13 on one side in the lamination direction and not to be adjacent to the second flow passage 12 on the other side in the lamination direction.

For example, the first flow passage 11 in the first layer is adjacent to the third flow passage 13 in the second layer only on one side in the lamination direction (the lower surface side), and is not adjacent to any other flow passage on the other side in the lamination direction (the upper surface side). Besides, the first flow passage 11 in the third layer is adjacent to the third flow passages 13 in the second and fourth layers on both the sides in the lamination direction (both the surface sides) respectively. As described hitherto, the first region has a region where the first flow passage 11 is adjacent only to the third flow passage 13. Thus, the heat exchanger is configured such that the Eng coolant and the T/M oil can exchange heat with each other without being influenced by the Eng oil.

The second region includes at least one three-layer flow passage group in which the third flow passage 13, the second flow passage 12 and the third flow passage 13 are sequentially adjacent to one another, and the second flow passages 12 and the third flow passages 13 are alternately arranged in the lamination direction. As shown in FIG. 11, the second region in the present embodiment of the disclosure is constituted of a total of four layers, namely, the third flow passage 13, the second flow passage 12, the third flow passage 13 and the second flow passage 12, which are arranged in this sequence from above.

The third region includes at least one three-layer flow passage group in which the second flow passage 12, the first flow passage 11 and the second flow passage 12 are sequentially adjacent to one another, and the first flow passages 11 and the second flow passages 12 are alternately arranged in the lamination direction. As shown in FIG. 11, the third region in the present embodiment of the disclosure is constituted of a total of four layers, namely, the first flow passage 11, the second flow passage 12, the first flow passage 11 and the second flow passage 12, which are arranged in this sequence from above.

Besides, as shown in FIG. 11, the third region includes the first flow passage 11 that is arranged in such a manner as to be adjacent to the second flow passage 12 on one side in the lamination direction and not to be adjacent to the third flow passage 13 on the other side in the lamination direction.

For example, the first flow passage 11 in the seventh layer is adjacent to the second flow passages 12 in the sixth and eighth layers on both the sides in the lamination direction (both the surface sides) respectively. As described hitherto, the third region has a region where the first flow passage 11 is adjacent only to the second flow passage 12. Thus, the heat exchanger is configured such that the Eng coolant and the Eng oil can exchange heat with each other without being influenced by the T/M oil.

As shown in FIG. 11, the first region, the third region and the second region are sequentially adjacent to one another in the lamination direction. Specifically, the third flow passage 13 that is arranged in the lowermost layer of the first region (the fourth layer) and the first flow passage 11 that is arranged in the uppermost layer of the third region (the fifth layer) are arranged adjacently to each other, and the second flow passage 12 that is arranged in the lowermost layer of the third region (the eighth layer) and the third flow passage 13 that is arranged in the uppermost layer of the second region (the ninth layer) are arranged adjacently to each other.

Flow directions of the fluids in the respective flow passages of the heat exchanger 1B will be described hereinafter with reference to FIG. 12.

The Eng coolant that has flowed from the first inflow hole 111 in the first layer (the first flow passage 11) into the first flow passage 11 branches off and flows into the first flow passages 11 in the third, fifth and seventh layers. Subsequently, the Eng coolant flows through the first flow passages 11 in the respective layers in the direction perpendicular to the lamination direction, then merges, and flows out from the first outflow hole 112 in the first layer (the first flow passage 11) to the outside of the heat exchanger 1B (the engine).

The Eng oil that has flowed from the second inflow hole 121 in the twelfth layer (the second flow passage 12) into the second flow passage 12 branches off and flows into the second flow passages 12 in the tenth, eighth and sixth layers. Subsequently, the Eng oil flows through the second flow passages 12 in the respective layers in the direction perpendicular to the lamination direction, then merges, and flows out from the second outflow hole 122 in the twelfth layer (the second flow passage 12) to the outside of the heat exchanger 1B (the engine).

The T/M oil that has flowed from the third inflow hole 131 in the eleventh layer (the third flow passage 13) into the third flow passage 13 via the interlayer communication passage 133 branches off and flows into the third flow passage 13 in the ninth layer. Then, the T/M oil flows through the third flow passages 13 in the respective layers in the direction perpendicular to the lamination direction, and then merges. Subsequently, the T/M oil branches off and flows into the third flow passages 13 in the fourth and second layers. Subsequently, the T/M oil flows through the third flow passages in the respective layers in the direction perpendicular to the lamination direction, then merges, and flows out from the third outflow hole 132 in the second layer (the third flow passage 13) to the outside of the heat exchanger 1B (the transmission) via the interlayer communication passage 133.

Figure 13:
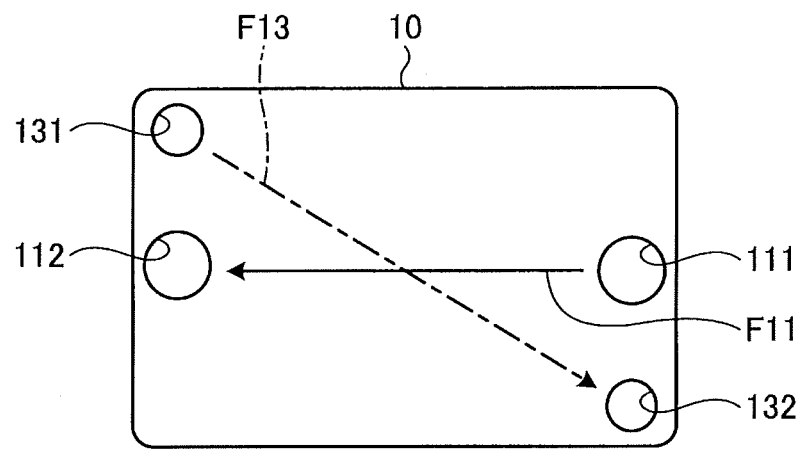
FIG. 13 is a view schematically showing positions of inflow holes and outflow holes for the respective fluids in each plate constituting a first region among respective flow passages of the heat exchanger for the vehicle according to the third embodiment of the disclosure.
Figure 14:
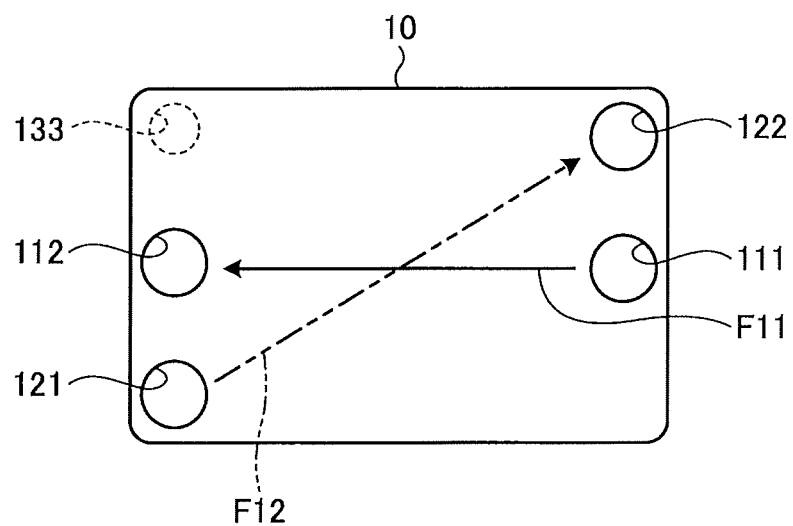
FIG. 14 is a view schematically showing positions of inflow holes and outflow holes for the respective fluids in each plate constituting a third region among the respective flow passages of the heat exchanger for the vehicle according to the third embodiment of the disclosure.
Figure 15:
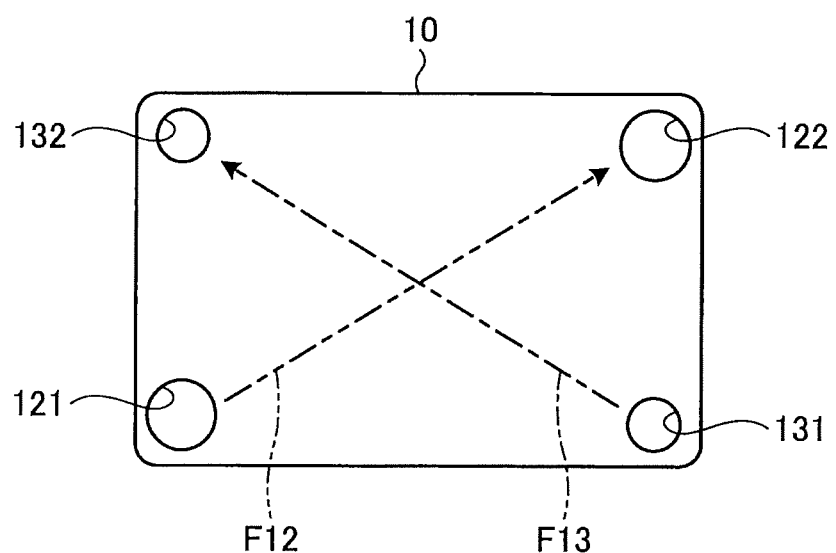
FIG. 15 is a view schematically showing positions of inflow holes and outflow holes for the respective fluids in each plate constituting a second region among the respective flow passages of the heat exchanger for the vehicle according to the third embodiment of the disclosure.

A relationship in flow direction of the fluids among the respective flow passages of the heat exchanger 1B will be described hereinafter with reference to FIGS. 13 to 15. FIG. 13 shows, in a projected manner, the positions of the inflow holes and outflow holes of the respective flow passages in the first region, on each of the plates 10 in a plan view along the lamination direction, in the heat exchanger 1B. Besides, FIG. 14 shows, in a projected manner, the positions of the inflow holes and outflow holes of the respective flow passages in the third region, on each of the plates 10 in a plan view along the lamination direction, in the heat exchanger 1B. Besides, FIG. 15 shows, in a projected manner, the positions of the inflow holes and outflow holes of the respective flow passages in the second region, on each of the plates 10 in a plan view along the lamination direction, in the heat exchanger 1B.

As shown in FIG. 13, the respective inflow holes and the respective outflow holes are formed through each of the plates 10 constituting the first flow passage 11 and the third flow passage 13 that are included in the first region among the respective flow passages of the heat exchanger 1B, at such positions that the flow direction F11 of the Eng coolant in the first flow passage 11 and the flow direction F13 of the T/M oil in the third flow passage 13 are opposed to each other. Incidentally, the positions of the respective inflow holes and outflow holes shown in the drawing are identical to those shown in the foregoing FIG. 3, so detailed description thereof will be omitted.

Figure 12:
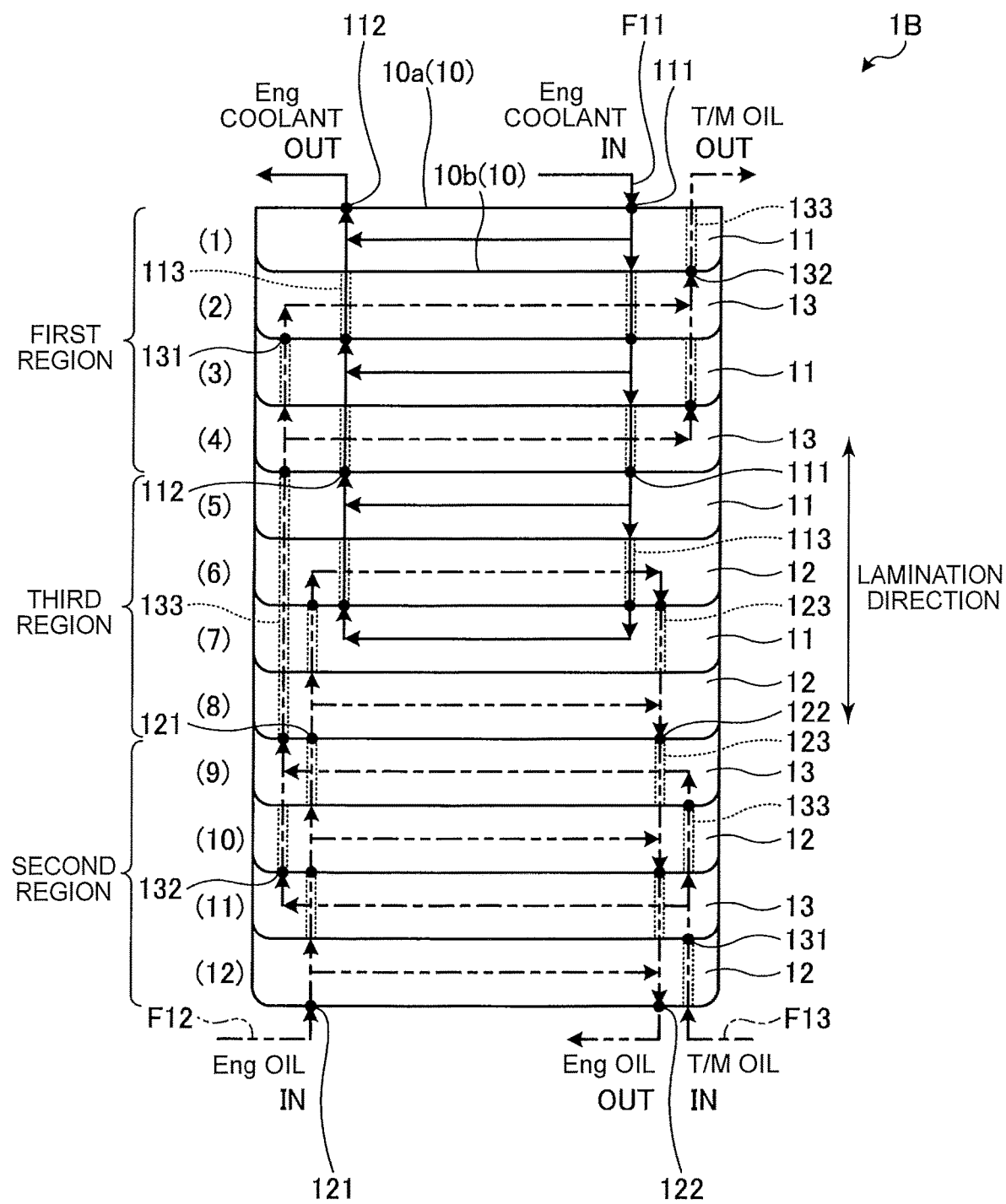
FIG. 12 is a view schematically showing flow directions of respective fluids and a sequence of heat exchange in the heat exchanger for the vehicle according to the third embodiment of the disclosure.

In the first region among the respective flow passages of the heat exchanger 1B, the principal line of the flow direction F11 of the Eng coolant and the principal line of the flow direction F13 of the T/M oil intersect with each other, so the flow direction F11 of the Eng coolant and the flow direction F13 of the T/M oil are opposed to each other (e.g., see the third and second layers in FIG. 12). Accordingly, heat exchange can be more efficiently carried out than in the case where the flow directions are parallel to each other.

As shown in FIG. 14, the respective inflow holes and the respective outflow holes are formed through each of the plates 10 constituting the first flow passage 11 and the second flow passage 12 that are included in the third region among the respective flow passages of the heat exchanger 1B, at such positions that the flow direction F11 of the Eng coolant in the first flow passage 11 and the flow direction F12 of the Eng oil in the second flow passage 12 are opposed to each other.

As shown in FIG. 14, the first inflow hole 111, the first outflow hole 112, the second inflow hole 121 and the second outflow hole 122 are formed through each of the plates 10 at such positions that a straight line joining the first inflow hole 111 and the first outflow hole 112 to each other (the principal line of the flow direction F11 of the Eng coolant) and a straight line joining the second inflow hole 121 and the second outflow hole 122 to each other (the principal line of the flow direction F12 of the Eng oil) intersect with each other.

More specifically, the first inflow hole 111 and the first outflow hole 112 are formed at widthwise central positions of two opposed sides of each of the plates 10 in a plan view. Besides, the second inflow hole 121 and the second outflow hole 122 are formed at diagonal positions through corner portions (round corner portions) of each of the plates 10 in a plan view.

As described hitherto, in the third region among the respective flow passages of the heat exchanger 1B, the principal line of the flow direction F11 of the Eng coolant and the principal line of the flow direction F12 of the Eng oil intersect with each other, so the flow direction F11 of the Eng coolant and the flow direction F12 of the Eng oil are opposed to each other (e.g., see the seventh and sixth layers in FIG. 12). Accordingly, heat exchange can be more efficiently carried out than in the case where the flow directions are parallel to each other.

As shown in FIG. 15, the respective inflow holes and the respective outflow holes are formed through each of the plates 10 constituting the second flow passage 12 and the third flow passage 13 that are included in the second region among the respective flow passages of the heat exchanger 1B, at such positions that the flow direction F12 of the Eng oil in the second flow passage 12 and the flow direction F13 of the T/M oil in the third flow passage 13 are opposed to each other.

As shown in FIG. 15, the second inflow hole 121, the second outflow hole 122, the third inflow hole 131 and the third outflow hole 132 are formed through each of the plates 10 at such positions that a straight line joining the second inflow hole 121 and the second outflow hole 122 to each other (the principal line of the flow direction F12 of the Eng oil) and a straight line joining the third inflow hole 131 and the third outflow hole 132 to each other (the principal line of the flow direction F13 of the T/M oil) intersect with each other.

More specifically, the second inflow hole 121 and the second outflow hole 122 are formed at diagonal positions through corner portions (round corner portions) of each of the plates 10 in a plan view. Besides, the third inflow hole 131 and the third outflow hole 132 are formed at diagonal positions through corner portions (round corner portions) of each of the plates 10 in a plan view.

As described hitherto, in the second region among the respective flow passages of the heat exchanger 1B, the principal line of the flow direction F12 of the Eng oil and the principal line of the flow direction F13 of the T/M oil intersect with each other. Thus, the flow direction F12 of the Eng oil and the flow direction F13 of the T/M oil are opposed to each other (e.g., see the tenth and eleventh layers in FIG. 12). Accordingly, heat exchange can be more efficiently carried out than in the case where the flow directions are parallel to each other.

The heat exchanger 1B configured as described above has the region where the first flow passage 11 is adjacent only to the third flow passage 13 in the lamination direction. Therefore, in this region, heat can be exchanged between the T/M oil and the Eng coolant without being influenced by the Eng oil. Accordingly, even in the case where the heat exchanger 1B is mounted in a vehicle having a power train in which the flow rate of the T/M oil is lower than the flow rate of the Eng oil, the amount of heat exchange between the T/M oil and the Eng coolant can be increased, and the temperature of the T/M oil can be sufficiently raised or lowered.

Besides, in the heat exchanger 1B according to the present embodiment of the disclosure as well as those according to the foregoing first and second embodiments of the disclosure, the specification of the amount of heat exchange between the T/M oil and the Eng coolant can be easily changed by increasing/reducing the number of repetition of the first flow passages 11 and the third flow passages 13 in the first region, and the specification of the amount of heat exchange between the Eng oil and the Eng coolant can be easily changed by increasing/reducing the number of repetition of the first flow passages 11 and the second flow passages 12 in the first region.

The heat exchangers according to the disclosure have been specifically described above, referring to the modes for carrying out the disclosure. However, the gist of the disclosure is not limited to the foregoing description, but should be broadly construed based on the claims. Besides, it goes without saying that the gist of the disclosure also encompasses various alterations, modifications and the like based on the foregoing description.

For example, as shown in FIG. 1, the foregoing heat exchanger 1 is constituted of a total of thirteen layers, the first region is constituted of a total of five layers, and the second region is constituted of a total of eight layers. However, the number of laminated flow passages of the heat exchanger 1 can be appropriately changed in accordance with the desired specification of the amount of heat exchange. That is, as long as the first region in the heat exchanger 1 includes at least one three-layer flow passage group in which the first flow passage 11, the third flow passage 13 and the first flow passage 11 are sequentially adjacent to one another, the number of laminated flow passages is not limited in particular. Besides, as long as the second region in the heat exchanger 1 includes at least one five-layer flow passage group in which the second flow passage 12, the third flow passage 13, the second flow passage 12, the first flow passage 11 and the second flow passage 12 are sequentially adjacent to one another, the number of laminated flow passages is not limited in particular.

Besides, as shown in FIG. 7, the foregoing heat exchanger 1A is constituted of a total of thirteen layers, the first region is constituted of a total of five layers, and the second region is constituted of a total of eight layers. However, the number of laminated flow passages of the heat exchanger 1A can be appropriately changed in accordance with the desired specification of the amount of heat exchange. That is, as long as the first region in the heat exchanger 1A includes at least one three-layer flow passage group in which the first flow passage 11, the second flow passage 12 and the first flow passage 11 are sequentially adjacent to one another, the number of laminated flow passages is not limited in particular. Besides, as long as the second region in the heat exchanger 1A includes at least one five-layer flow passage group in which the third flow passage 13, the second flow passage 12, the third flow passage 13, the first flow passage 11 and the third flow passage 13 are sequentially adjacent to one another, the number of laminated flow passages is not limited in particular.

Besides, as shown in FIG. 11, the foregoing heat exchanger 1B is constituted of a total of twelve layers, and each of the first region, the second region and the third region is constituted of a total of four layers. However, the number of laminated flow passages of the heat exchanger 1B can be appropriately changed in accordance with the desired specification of the amount of heat exchange. That is, as long as the first region in the heat exchanger 1B includes at least one three-layer flow passage group in which the first flow passage 11, the third flow passage 13 and the first flow passage 11 are sequentially adjacent to one another, the number of laminated flow passages is not limited in particular. Besides, as long as the second region in the heat exchanger 1B includes at least one three-layer flow passage group in which the third flow passage 13, the second flow passage 12 and the third flow passage 13 are sequentially adjacent to one another, the number of laminated flow passages is not limited in particular. Besides, as long as the third region in the heat exchanger 1B includes at least one three-layer flow passage group in which the first flow passage 11, the second flow passage 12 and the first flow passage 11 are sequentially adjacent to one another, the number of laminated flow passages is not limited in particular.

What is claimed is:

1. A heat exchanger for a vehicle, the vehicle including a power train that is configured such that an engine coolant, an engine oil and a transmission oil flow through the power train and that a flow rate of the engine oil and a flow rate of the transmission oil are different from each other,
the heat exchanger comprising:
a plurality of plates laminated with one another;
a first flow passage through which the engine coolant flows to undergo heat exchange;
a second flow passage through which the engine oil flows to undergo heat exchange;
a third flow passage through which the transmission oil flows to undergo heat exchange;
a first region in which:
only the first flow passage and the third flow passage flow,
each plate across which the first flow passage flows is arranged to alternate with and is adjacent to a plate in which the third flow passage flows, and
a fluid flow of the third passage is lower than a fluid flow in the first passage; and
a second region in which:
in a lamination direction:
a first plate of the plurality of plates comprising a portion of the second flow passage is adjacent to a second plate of the plurality of plates comprising a portion of the third flow passage,
the second plate is adjacent to a third plate of the plurality of plates comprising a portion of the second flow passage,
the third plate is adjacent to a fourth plate of the plurality of plates comprising a portion of the first flow passage, and
the fourth plate is adjacent to a fifth plate comprising the second planar flow passage,
wherein each of the plurality of plates comprises at least one of: a portion of the first flow passage, a portion the second flow passage, and a portion the third flow passage;
wherein the first flow passage, the second flow passage, and the third flow passage are compartmentalized such that fluids flowing through the respective flow passages do not mix with one another,
wherein heat exchange is carried out between the respective flow passages that are adjacent to each other in a lamination direction of the plurality of the plates,
wherein the power train is configured such that the flow rate of the transmission oil is lower than the flow rate of the engine oil,
wherein the first region and the second region are adjacent to each other in the lamination direction.

2. The heat exchanger according to claim 1, wherein
a first portion of the third flow passage in the second region is located upstream of a second portion of the third flow passage in the first region, in a flow direction of the transmission oil flowing through the heat exchanger.

3. The heat exchanger according to claim 1, wherein
the plurality of plates includes a plurality of inflow holes and a plurality of outflow holes,
each of the plurality of plates includes at least one of the plurality of inflow holes and at least one of the plurality of outflow holes,
each inflow hole and each outflow hole providing a passage for at least one of: the engine coolant, the engine oil, and the transmission oil, and
wherein the plurality of inflow holes and the plurality of outflow holes are arranged such that that flow directions of fluids flowing through adjacent plates are opposite to each other.

4. The heat exchanger according to claim 3, wherein
in at least one plate, in a plan view along the lamination direction, a first straight line from an inflow hole corresponding to a portion of the second flow passage to an outflow hole corresponding to a portion of the second flow passage intersects with a second straight line from an inflow hole corresponding to the third flow passage to an outflow holes corresponding to the third flow passage.

5. A heat exchanger for a vehicle, the vehicle including a power train that is configured such that an engine coolant, an engine oil and a transmission oil flow through the power train and that a flow rate of the engine oil and a flow rate of the transmission oil are different from each other,
the heat exchanger comprising:
a plurality of plates laminated with one another;
a first flow passage through which the engine coolant flows to undergo heat exchange;
a second flow passage through which the engine oil flows to undergo heat exchange;
a third flow passage through which the transmission oil flows to undergo heat exchange;
a first region in which:
only the first flow passage and second flow passage flow, and
each plate across which the first flow passage flows is arranged to alternate with and is adjacent to a plate in which the second flow passage flows; and
a second region in which:
in a lamination direction:
a first plate of the plurality of plates comprising a portion of the third flow passage is adjacent to a second plate of the plurality of plates comprising a portion of the second flow passage,
the second plate is adjacent to a third plate of the plurality of plates comprising a portion of the third flow passage,
the third plate is adjacent to a fourth plate of the plurality of plates comprising a portion of the first flow passage, and
the fourth plate is adjacent to a fifth plate comprising the third planar flow passage;

wherein the first flow passage, the second flow passage, and the third flow passage are compartmentalized such that fluids flowing through the respective flow passages do not mix with one another, wherein heat exchange is carried out between the respective flow passages that are adjacent to each other in a lamination direction of the plurality of the plates, wherein the power train is configured such that a flow rate of the engine oil is lower than a flow rate of the transmission oil, and wherein the first region and the second region are adjacent to each other in the lamination direction.

6. The heat exchanger according to claim 5, wherein a first portion of the third flow passage in the second region is located upstream of a second portion of the third flow passage in the first region, in a flow direction of the transmission oil flowing through the heat exchanger.

7. A heat exchanger for a vehicle, the vehicle including a power train that is configured such that an engine coolant, an engine oil and a transmission oil flow through the power train and that a flow rate of the engine oil and a flow rate of the transmission oil are different from each other, the heat exchanger comprising:
 a plurality of plates laminated with one another;
 a first flow passage through which the engine coolant flows to undergo heat exchange;
 a second flow passage through which the engine oil flows to undergo heat exchange;
 a third flow passage through which the transmission oil flows to undergo heat exchange;
 a first region in which:
  only the first flow passage and the third flow passage flow, and
  each plate across which the first flow passage flows is arranged to alternate with and is adjacent to a plate in which the third flow passage flows; and
 a second region in which:
  only the first flow passage and the second flow passage flow, and
  each plate across which the first flow passage flows is arranged to alternate with and is adjacent to a plate in which the second flow passage flows;
 a third region in which:
  only the second flow passage and the third flow passage flow, and
  each plate across which the second flow passage flows is arranged to alternate with and is adjacent to a plate in which the third flow passage flows;

wherein the first flow passage, the second flow passage and the third flow passage being compartmentalized such that fluids flowing through the respective flow passages do not mix with one another, wherein heat exchange is carried out between the respective flow passages that are adjacent to each other in a lamination direction of the plurality of the plates, wherein the power train is configured such that a flow rate of the transmission oil is lower than a flow rate of the engine oil, and wherein the first region, the second region, and the third region are adjacent to one another in the lamination direction in a sequence of the first region, the third region and the second region.

8. The heat exchanger according to claim 7, wherein a first portion of the third flow passage in the second region is located upstream of a second portion of the third flow passage in the first region, in a flow direction of the transmission oil flowing through the heat exchanger.

* * * * *